(12) United States Patent
Nakayama et al.

(10) Patent No.: US 6,308,024 B1
(45) Date of Patent: Oct. 23, 2001

(54) DUST PROTECTOR FOR IMAGE EXPOSURE DEVICE AND IMAGE FORMING APPARATUS UTILIZING THE SAME

(75) Inventors: Yutaka Nakayama; Yoshihiko Ichikawa; Masayoshi Nishida; Tomonori Ishikawa; Tohru Hisano; Naoyuki Egusa, all of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/588,047

(22) Filed: Jun. 6, 2000

(30) Foreign Application Priority Data

Aug. 30, 1999 (JP) .................................................. 11-244077

(51) Int. Cl.⁷ .................................................. G03G 21/00
(52) U.S. Cl. .................................. 399/98; 399/92; 399/93
(58) Field of Search .................................. 399/91, 92, 93, 399/98

(56) References Cited

U.S. PATENT DOCUMENTS

| | | | |
|---|---|---|---|
| 4,074,217 | * | 2/1978 | Yanagawa ........................ 399/98 X |
| 4,540,268 | * | 9/1985 | Toyono et al. ........................ 399/93 |
| 4,693,588 | * | 9/1987 | Yarbrough et al. ................... 399/93 |
| 4,720,727 | * | 1/1988 | Yoshida ................................ 399/93 |
| 4,970,552 | * | 11/1990 | Okamoto et al. ..................... 399/98 |
| 5,038,170 | * | 8/1991 | Serita ................................... 399/92 |
| 5,192,973 | * | 3/1993 | Hickisch .............................. 399/93 |
| 5,717,505 | * | 2/1998 | Chang et al. .................... 399/98 X |
| 5,729,793 | * | 3/1998 | Inoue ................................... 399/92 |
| 6,029,028 | * | 2/2000 | Inoue ................................... 399/92 |
| 6,173,132 | * | 1/2001 | Kida et al. ..................... 399/92 X |
| 6,219,504 | * | 4/2001 | Matsuzaki et al. .................. 399/92 |

FOREIGN PATENT DOCUMENTS

| | | |
|---|---|---|
| U-61-179567 | 11/1986 | (JP) . |
| A-62-175783 | 8/1987 | (JP) . |
| A-2-115870 | 4/1990 | (JP) . |
| U-2-112441 | 9/1990 | (JP) . |
| U-2-121748 | 10/1990 | (JP) . |
| A-3-221473 | 9/1991 | (JP) . |
| U-3-92651 | 9/1991 | (JP) . |
| A-5-61307 | 3/1993 | (JP) . |
| A-5-177864 | 7/1993 | (JP) . |
| A-7-140747 | 6/1995 | (JP) . |
| A-8-95333 | 4/1996 | (JP) . |
| A-9-26551 | 1/1997 | (JP) . |
| A-9-80343 | 3/1997 | (JP) . |
| A-10-230640 | 9/1998 | (JP) . |
| A-10-307439 | 11/1998 | (JP) . |
| A-11-14925 | 1/1999 | (JP) . |

* cited by examiner

Primary Examiner—Susan S.Y. Lee
(74) Attorney, Agent, or Firm—Oliff & Berridge, PLC

(57) ABSTRACT

It is a purpose of the invention to provide a dust protector for an image exposure device capable of preventing particles from sticking to windows or the like of the image exposure device and free from moisture condensation on the windows or the like of the image exposure device as a result of direct exposure of the same to the atmosphere and an image forming apparatus utilizing the same. The purpose is achieved by providing a dust protector for an image exposure device for performing image exposure on a member to be exposed from below with a dust protective member for preventing particles from sticking to at least a member located above an optical path of the image exposure device by covering the image exposure device from above without blocking the optical path of the image exposure device and an air flow generating unit for generating an air flow that prevents particles from entering the region covered by the dust protective member.

19 Claims, 26 Drawing Sheets

FIG. 17A

| | FACTOR | 1 | 2 | NOTE |
|---|---|---|---|---|
| 1 | RECTIFIER PLATE END POSITION | ENTRANCE OF ENGINE NO.1 | POSITION APART FROM ENGINE NO.1 ENTRANCE | REAR END IS FLUSH WITH RIGHT BAFFLE |
| 2 | ANGLE OF RIGHT BAFFLE | 132° (ROS TYPE) | 104° (LED TYPE) | |
| 3 | ROUNDING OF RIGHT BAFFLE | PROVIDED (R15) | NONE | |
| 4 | ROUNDING OF RECTIFIER PLATE R | LARGE (R75) | SMALL (R10) | AT 90° TO BAFFLE |
| 5 | NUMBER OF RECTIFIER PLATES | 3 | 2 | |
| 6 | ANGLE OF LEFT BAFFLE | 82° (ROS TYPE) | 107° (LED TYPE) | |
| 7 | PARTITION PLATE IN BAFFLE | PROVIDED | NONE | |
| 8 | HEIGHT OF RECTIFIER PLATE | HEIGHT (UP TO CEILING) | LOW | |
| 9 | HEIGHT OF BASE FRAME | LOW | HIGH | THE HEIGHT DIFFERENCE IS 7 mm |
| 10 | PATTERN OF OPENING AT RECTIFIER PLATE ENTRANCE | AREA CHANGES GRADUALLY | AREA IS CONSTANT | CHANNEL BECOMES NARROWER AS IT PROCEEDS INSIDE RECTIFIER PLATE |

FIG. 17B

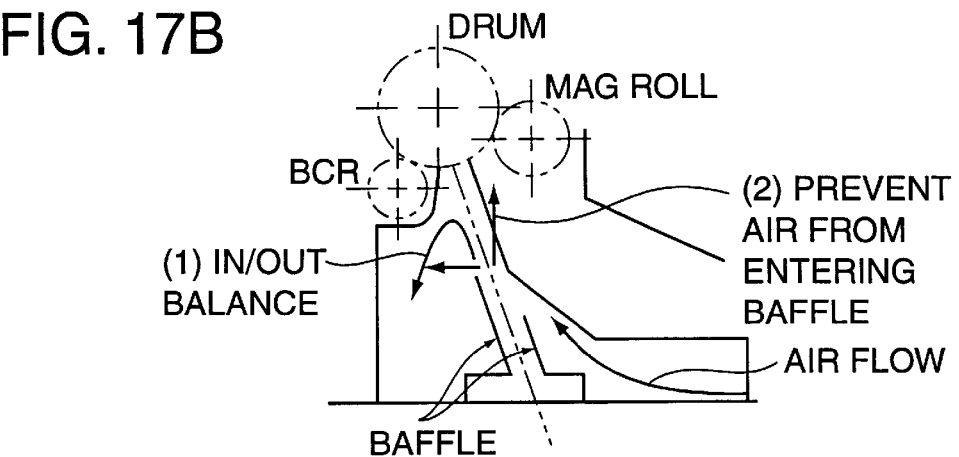

FIG.23A   VARIANCE ANALYSIS TABLE((1)IN/OUT BALANCE)

| FACTOR SOURCE | DEGREE OF FREEDOM f | SALTUS S | VARIANCE V | * | VARIANCE RATIO F. | — | PURE VARIANCE S' | CONTRIBUTION ρ |
|---|---|---|---|---|---|---|---|---|
| A: RECTIFIER PLATE END POSITION | 1 | 34.51021 | 34.510208 | | 11.11 | * | 31.4041 | 13.4 |
| B: ANGLE OF RIGHT BAFFLE | 1 | 3.17241 | 3.172408 | * | | | | |
| C: ROUNDING OF RIGHT BAFFLE | 1 | 0.12607 | 0.126075 | * | | | | |
| D: ROUNDING OF RECTIFIER PLATE | 1 | 54.23001 | 54.230008 | | 17.46 | ** | 51.1239 | 21.7 |
| E: NUMBER OF RECTIFIER PLATES | 1 | 0.06307 | 0.063075 | * | | | | |
| F: ANGLE OF LEFT BAFFLE | 1 | 39.71241 | 39.712408 | | 12.79 | * | 36.6063 | 15.6 |
| G: PARTITION PLATE INSIDE BAFFLE | 1 | 6.40941 | 6.409408 | | 2.06 | | 3.30332 | 1.4 |
| H: HEIGHT OF RECTIFIER PLATE | 1 | 4.45301 | 4.453008 | | 1.43 | | 1.34692 | 0.6 |
| I: HEIGHT OF BASE | 1 | 2.71701 | 2.717008 | * | | | | |
| J: PATTERN OF OPENING | 1 | 80.23841 | 80.238408 | | 25.83 | ** | 77.1323 | 32.8 |
| K: ERROR | 1 | 9.45187 | 9.451875 | * | | | | |
| (e) | 5 | 15.53044 | 3.106088 | | | | 34.167 | 14.5 |
| T | 11 | 235.08389 | | | | | 235.084 | 100 |

FIG.24A

VARIANCE ANALYSIS TABLE((2)PREVENTION OF ENTRANCE OF AIR INTO BAFFLE)

| FACTOR SOURCE | DEGREE OF FREEDOM f | SALTUS S | VARIANCE V | * | VARIANCE RATIO F. | — | PURE VARIANCE S' | CONTRIBUTION ρ |
|---|---|---|---|---|---|---|---|---|
| A: RECTIFIER PLATE END POSITION | 1 | 13.80307 | 13.803075 | | 5.25 | * | 11.1759 | 1.5 |
| B: ANGLE OF RIGHT BAFFLE | 1 | 59.80868 | 59.808675 | | 22.77 | ** | 57.1815 | 7.9 |
| C: ROUNDING OF RIGHT BAFFLE | 1 | 121.66701 | 121.66701 | | 46.31 | ** | 119.04 | 16.4 |
| D: ROUNDING OF RECTIFIER PLATE | 1 | 285.87041 | 285.87041 | | 108.81 | ** | 283.243 | 39 |
| E: NUMBER OF RECTIFIER PLATES | 1 | 0.18501 | 0.185008 | * | | | | |
| F: ANGLE OF LEFT BAFFLE | 1 | 183.69188 | 183.69188 | | 69.92 | ** | 181.065 | 24.9 |
| G: PARTITION PLATE INSIDE BAFFLE | 1 | 16.63808 | 16.638075 | | 6.33 | | 14.0109 | 1.9 |
| H: HEIGHT OF RECTIFIER PLATE | 1 | 3.72968 | 3.729675 | * | | | | |
| I: HEIGHT OF BASE | 1 | 34.85021 | 34.850208 | | 13.27 | * | 32.223 | 4.4 |
| J: PATTERN OF OPENING | 1 | 1.27401 | 1.274008 | * | | | | |
| K: ERROR | 1 | 5.32001 | 5.320008 | * | | | | |
| (e) | 4 | 10.5087 | 2.627175 | | | | 28.8989 | 4 |
| T | 11 | 726.83803 | | | | | 726.838 | 100 |

DUST PROTECTOR FOR IMAGE EXPOSURE DEVICE AND IMAGE FORMING APPARATUS UTILIZING THE SAME

BACKGROUND OF THE INVENTION

1. Field of the Invention

The present invention relates to a dust protector for preventing particles such as toner and dust from sticking to an image exposure device such as ROS (raster output scanner) and LED array used in an image forming apparatus such as a printer and copying machine utilizing an electrophotographic system, and the image forming apparatus utilizing the same. More particularly, the invention relates to a dust protector suitable for an image exposure device for performing image exposure on a member to be exposed from below and an image forming apparatus utilizing the same.

2. Description of the Related Art

Conventional image forming apparatuses of this type such as printers and copying machines utilizing an electrophotographic system have a configuration in which image exposure is performed by an image exposure device such as an ROS or LED array on a surface of a photosensitive drum to form an electrostatic latent image thereon in accordance with image information and in which the electrostatic latent image is developed and transferred to and fused on transfer paper to form a monochrome or full color image on the same.

As image forming apparatuses for such printers, copying machines and the like, a variety of so-called tandem type color image forming apparatuses have been proposed in which plural image forming units for forming images in predetermined colors on a photosensitive drum are provided in parallel with each other to allow high speed formation of a full color image and in which the images in different colors formed by the plurality of image forming units are directly transferred to transfer ipaper transported by a transfer material transport belt on a multiplex basis or are temporarily transferred to an intermediate transfer belt on a multiplex basis and are thereafter subjected to a secondary transfer from the intermediate transfer belt to transfer paper at a time. Such apparatuses have already been released as products by the present applicant.

The so-called tandem type full color image forming apparatuses as described above have a configuration in which image forming units for colors such as yellow (Y), magenta (M), cyan (C) and black (K) are provided in parallel with each other; image exposure is performed on a surface of a photosensitive drum of each of the image forming, units by an image exposure device such as an ROS or LED array provided above the photosensitive drums to form latent images in accordance with image information; and the latent images are developed and transferred to and fused on transfer paper to form a full color image.

Tandem type full color image forming apparatuses as described above have a problem that the apparatuses become massive because four image forming units for colors such as yellow (Y), magenta (MH, cyan (C) and black (K) are provided in parallel with each other and a transfer material transport belt and an intermediate transfer belt for transferring images from those four image forming units must be provided under the same and because a transport material must be provided under those belts to transport transfer paper removed from the transfer material transfer belt and/or to transport transfer paper on which images have been transferred from the intermediate transfer belt.

Techniques have already been proposed to allow tandem type full color image forming apparatuses as described above to be made compact including, for example, those disclosed in Japanese unexamined patent publications No. H5-61307/1993, No. H7-140747/1995, No. H8-95333/1996, No. H10-307439/1998, etc.

A color image forming apparatus according to Japanese unexamined patent publication No. H5-61307 is a color image forming apparatus having an image forming body in the form of a stretched belt and plural developers provided under the same in which a cleaning portion is disposed adjacent to the developers and in which the image forming bodies and the developers are configured such that they can be integrally attached to and detached from the image forming apparatus.

A color image forming apparatus according to Japanese unexamined patent publication No. H7-140474 is equipped with four processing units having at least a photosensitive body and a developer for forming images in four different colors, two optical beam generating units, a polarizing unit having at least a set of polarizing mirrors and a set of lenses and a splitting unit for splitting two optical beams from the two optical beam generating units and for guiding the split four optical beams to the four respective photosensitive bodies. The apparatus is configured such that each of the processing units sequentially forms an image in one respective color.

A color image forming apparatus according to Japanese unexamined patent publication No. H8-95333 is an image forming apparatus wherein three or more image forming units are arranged each of which is formed by arranging rows of light-emitting elements in the form of an array on an inner circumference of a photosensitive drum formed by sequentially stacking a translucent conductive layer and a photoconductive layer on a translucent support body in the axial direction of the drum. The image forming unit at one end is configured as a monochrome image forming mechanism which uses a black toner in a developing portion thereof, and developing portions and transfer portions of the remaining image forming units are respectively provided under and above the photosensitive drums thereof. The image forming units are connected with a transfer belt. An image forming mechanism for monochrome or color images is provided by using a black toner in the developing portion of the image forming unit adjacent to the monochrome image forming mechanism and color toners in the developing portions of the remaining image forming units. The image forming apparatus is configured with a detecting unit for detecting each of sheets of paper supplied from a cassette sequentially, a switching unit for transporting the sheets of paper sequentially supplied from the cassette to the monochrome image forming mechanism or the monochrome/color image forming mechanism alternately according to a detection signal from the detecting unit and a fusing unit for sequentially fusing sheets of paper on which image transfer has been performed by the monochrome image forming mechanism or monochrome/color image forming mechanism alternately.

An image forming apparatus according to the Japanese unexamined patent publication No. H10-307439 is an image forming apparatus having a writing unit for illuminating plural photosensitive bodies provided in association with respective component colors with illumination beams modulated based on image information in respective component colors to form electrostatic latent images associated with the colors of the image information on the respective photosensitive bodies, a transport unit for transporting transfer paper on which images are to be formed from the image information, an image forming unit including the plural photosensitive bodies, disposed close to the transport unit in a face-to-face relationship therewith, for transferring the image information as images formed on the photosensitive bodies to the transfer paper and a fusing unit disposed at one end of the transport unit for performing a fusing process on the transfer paper on which the image information has been transferred. The writing unit is disposed under the image forming unit, and the transport unit, transfer unit and fusing unit are disposed to be able to rotate integrally with the image forming unit such that they define a sufficient operating space with the image forming unit.

However, in the case of the image forming apparatuses disclosed in the Japanese unexamined patent publications No. H5-61307, No. H7-140747 and No. H8-95333, although the tandem type full color image forming apparatuses can be made compact, the image exposure devices such as the writing unit of those image forming apparatuses must be provided under the respective image forming units as disclosed in Japanese unexamined patent publications No. H7-140747 and No. H10-307439. Therefore, in the image forming apparatuses according to the above proposals, toner drops from the developers or the like of the image forming units on the image exposure devices such as the writing unit located thereunder and sticks thereto to partially obscure an image to be exposed, which has resulted in a problem in that image quality is reduced. Such a problem arises not only when the image exposure devices such as the writing unit are provided under the respective image forming units as described above in order to make the tandem type full color image forming apparatuses compact but also when an image exposure device such as a writing unit of a monochrome image forming apparatus is provided under a photosensitive drum.

Various techniques to solve such a problem have been proposed, including a first technique disclosed in Japanese unexamined patent publications No. H3-22147/1991 and No. H9-80343/1997, a second technique disclosed in Japanese unexamined utility model publications No. H2-121748/1990, No. H3-92651/1991, and Japanese unexamined patent publications No. H9-26551/1997, No. H5-177864/1993 and No. S62-175783/1987 and Japanese unexamined utility model publication No. H2-112441/1990 and a third technique disclosed in Japanese unexamined utility model publications No. H2-112441/1990, No. 61-179567/1986 and Japanese unexamined patent publications No. H11-14925/1999, No. H10-230640/1998 and No. H2-115870/1990.

An LED printer according to Japanese unexamined patent publication No. H3-221473 classified as the first solution has a configuration in which a part of cooling air for cooling an LED head is directed to a light-emitting portion of the LED head to prevent from toner from sticking to the light-emitting portion of the LED head. It also includes a configuration in which a duct structure is provided around the LED head and in which a shutter is provided to close the opening of the duct when no printing is performed.

In an image scanning apparatus having a polarizer contained in a casing with a cover glass that transmits scanning beams, a dust blocking device for an image scanning apparatus according to Japanese unexamined patent publication No. H9-80343 also classified as the first solution is configured as a device for generating an air flow in front of the cover glass. The configuration also includes an opening provided in front of the cover glass and a shutter provided for opening and closing the opening which is closed when the flow of air is not to be generated.

A laser printer according to Japanese unexamined utility model publication No. H2-121748 classified as the second solution is a laser printer in which laser beams carrying image information are emitted by an optical system contained in a housing through a light-emitting portion provided on the housing to perform optical writing on a photosensitive body. It has a configuration in which a blower for ventilating the light-emitting portion is provided as a device for preventing foreign substances from entering or sticking to the light emitting portion.

An electrophotographic printer according to Japanese unexamined patent publication No. H3-92651 also classified as the second solution is an electrophotographic printer in which an optical unit formed by providing a dust protective glass on a window through which optical beams pass in a face-to-face relationship with an image carrying body. The printer has a hood provided at the window such that it does not block the optical beams, a duct in communication with the hood and a blower for supplying air into the duct and has a configuration in which the air supplied by the blower flows into the hood through the duct to be blown out from an opening on the hood.

In an image scanning apparatus having a polarizer contained in a casing, a dust blocking device for an image scanning apparatus according to Japanese unexamined patent publication No. H9-26551 also classified as the second solution is configured as a device for generating an air flow in the casing to discharge air from the interior of the casing to the outside through an opening for emitting scanning beams.

Further, an optical printer head according to the Japanese unexamined patent publication No. H5-177864 similarly classified as the second solution is formed by a light-emitting element array as an exposure light source formed by plural light-emitting elements, a self-focusing lens for forming an image of light emitted by the light-emitting element array on a photosensitive body, a radiating fin in contact with the light-emitting element array and a head case containing the light-emitting element array, self-focusing lens and radiating fin and having an intake port, an exhaust port formed in the vicinity of a lens surface of the self-focusing lens and a ventilating path defined therein.

An optical scan type electrophotographic recording apparatus according to Japanese unexamined patent publication No. S62-175783 similarly classified as the second solution has a configuration in which a particle removing device is provided between an imaging optical system and a photosensitive body for protecting the imaging optical system from the adhesion of particles such as a developing agent. It also includes a configuration in which the removing device is constituted by an air curtain formed between the imaging optical system and photosensitive body.

An optical printer head according to Japanese unexamined utility model publication No. H2-112441 similarly classified as the second solution has a configuration in which a ventilation hole is provided in a side cover of a self-focusing lens array such that it extends from an intake port at a lower part of the side cover to a top surface of the same in order to generate air flows for preventing adhesion of toner on both sides of a surface of the self-focusing lens during printing.

A laser beam exposure device according to Japanese unexamined utility model publication No. S61-179567 classified as the third solution has a configuration in which an emitting portion hood in a flat configuration is provided outside a slit-like opening of an exposure device housing through which laser beams are emitted toward a photosensitive body, the width of an opening at the end of the hood being smaller than the width of the opening in the form of a slit.

A laser writing device according to Japanese unexamined patent publication No. H11-14925 similarly classified as the third solution has a configuration in which a dust protecting/optically guiding device having a multi-layer structure is provided outside an opening in the form of a slit.

An optical writing unit according to Japanese unexamined patent publication No. H10-230640 similarly classified as the third solution has a configuration in which a visor-shaped member is provided directly above a laser beam emitting portion of the optical writing unit.

A dust protector for an optical writing device according to Japanese unexamined patent publication No. H2-115870 similarly classified as the third solution is a dust protector for an optical writing device of an electrostatic recording apparatus in which optical writing is performed by scanning a photosensitive body in the axial direction thereof with beams of light emitted by a writing optical system provided under the photosensitive body and contained in a housing upward at an angle to a vertical plane through a translucent dust protective shield plate removably inserted in an emitting opening of the housing. The configuration includes a pair of upper and lower dust protective covers on both sides of the path of optical writing for defining a writing beam emission opening close to the photosensitive body, provided on supporting portions of the dust protective shield plate on both sides of the dust protective shield plate in the direction of optical scanning, a rib protruding from an inner side of the lower dust protective cover throughout the entire length thereof such that it does not interfere the writing optical path, an intake duct in and from which the dust protective shield can be inserted and removed and which has an intake port that opens above the rib and an exhaust port at one end thereof in the direction of optical scanning.

There are problems with the above conventional techniques as described below. The technique disclosed in Japanese unexamined patent publications No. H3-221473 and No. H9-80343 classified as the first solution has a problem associated with the shutter provided in the air flow channel in that an air flow is blocked as the shutter is closed and the shutter can get dirty because of drifting toner when it is closed immediately after writing to dirt and damage the LED head consequently and in that dust can enter from the air intake side even when the shutter is closed. Further, since an air flow is generated in front of the cover glass of the image exposure device, the cover glass is directly exposed to the atmosphere, which results in a problem in that moisture condensation occurs on the cover glass in winter or in a similar situation.

In the case of the technique disclosed in Japanese unexamined utility model publications No. H2-121748 and H3-92651, Japanese unexamined patent publications No. H9-26551, No. H5-177864 and No. S62-175783 and Japanese unexamined utility model publication No. H2-112441, since the blower is provided to ventilate air in the light-emitting portion, a problem arises in that moisture condensation is likely to occur because the window of the light-emitting portion is directly exposed to the atmosphere. Further, the blower for ventilating air in the light-emitting portion of the image exposure device scatters dust around itself, which can dirt and damage the window of the light-emitting portion and the like.

Further, in the case of the technique disclosed in Japanese unexamined utility model publications No. H2-112441 and No. S61-179567 and Japanese unexamined patent publications No. H11-14925 and No. H10-230640 classified as the third solution, while it employs a configuration in which the hood of the emitting portion, dust protecting/light guiding device or visor-shaped member is provided to prevent particles from dropping into the apparatus when the optical path is vertical or diagonal, drifting dust can enter because the top of the hood of the emitting portion and or like is always open. In the case of the dust protector for an optical writing device according to Japanese unexamined patent publication No. H2-115870, it generates an air flow in the longitudinal direction of the dust protective shield plate. As a result, moisture condensation is likely to occur because the dust protective shield plate is directly exposed to the atmosphere and, in addition, an air flow resulting from the rotation of a photosensitive body is disturbed by an end of the dust protective cover formed close to the photosensitive body. The disturbance in the flow of air at the end of the dust protective cover causes air to flow inside the dust protective cover, which results in a problem in that particles enter the dust protective cover along with the air flow and stick to the dust protective shield plate and the like.

SUMMARY OF THE INVENTION

The present invention has been made in order to solve the above-described problems of the related arts. It provides a dust protector for an image exposure device which is not only capable of preventing particles from sticking to a window and the like of an image exposure device but also free from the possibility of moisture condensation as a result of direct contact between the window and the like of the image exposure device and the atmosphere and provides an image forming apparatus utilizing the same.

The present invention also provides a dust protector for an image exposure apparatus which eliminates the possibility of dirt on a shutter member provided in the vicinity of a window or the like of an image exposure device when needed and provides an image forming apparatus utilizing the same.

The present invention also provides a dust protector for an image exposure device which eliminates the possibility of dirt and damage on a window or the like of an image exposure device by blowing on the window or the like with a blower to scatter dust around the window or the like and provides an image forming apparatus utilizing the same.

The present invention further provides a dust protector for an image exposure device capable of reliably preventing particles from entering an image exposure device through an opening of a dust protective member and consequently contaminating and damaging members such as a window even when the dust protective member is provided above the window or the like of the image exposure device and provides an image forming apparatus utilizing the same.

In order to solve the above-described problems, according to a first aspect of the invention, there is provided a dust protector for an image exposure device for performing image exposure on a member to be exposed from below the same, having a dust protective member for covering the image exposure device from above without blocking the optical path of the image exposure device and an air flow generating unit for generating an air flow for preventing particles from entering the region covered by the dust protective member.

While the dust protector for an image exposure device is used in, for example, an image forming apparatus having plural members to be exposed such as photosensitive drums, it is not limited thereto and may obviously be used in an image forming apparatus having only one member to be exposed such as a photosensitive drum.

According to a second aspect of the invention, there is provided a dust protector for an image exposure device according to the first aspect, characterized in that the air flow generating unit generates an air flow which passes over an opening located at an upper end of the dust protective member.

According to a third aspect of the invention, there is provided a dust protector for an image exposure device according to the first or second aspect of the invention, characterized in that there is provided a shutter member which is provided below the path of the air flow and which can be moved to a position where it directly covers at least a member located above the optical path of the image exposure device.

According to a fourth aspect of the invention, there is provided a dust protector for an image exposure device according to any of the first through third aspects of the invention, characterized in that the air flow generating unit is set such that it generates substantially zero static pressure above the opening located at the upper end of the dust protective member and such that it generates a positive pressure and a negative pressure upstream and downstream of the opening respectively.

According to a fifth aspect of the invention, there is provided a dust protector for an image exposure device according to any of the first through fourth aspects of the invention, characterized in that the air flow generating unit has at least either an intake unit for taking air from one end of the member to be exposed in the longitudinal direction thereof or an exhaust unit for exhausting air therefrom and a rectifier plate for deflecting the direction of the air flow taken in or exhausted by the intake or exhaust unit in a substantially orthogonal direction to generate a substantially uniform air flow in the longitudinal direction of the member to be exposed.

According to a sixth aspect of the invention, there is provided a dust protector for an image exposure device according to the fifth aspect of the invention, characterized in that plural rectifier plates are provided for generating a substantially uniform air flow in the longitudinal direction of the member to be exposed and in that the spaces separated by the rectifier plates at the end where the intake or exhaust unit is located are open with gradually changing opening areas.

According to a seventh aspect of the invention, there is provided a dust protector for an image exposure device according to any of the first through seventh aspects of the invention, characterized in that a part of the dust protective member is located in proximity to a surface of an image forming member located in the vicinity thereof to define a microscopic gap between the dust protective member and the surface of the image forming member, thereby generating an air flow that passes through the microscopic gap.

According to an eighth aspect of the invention, there is provided a dust protector for an image exposure device according to the eighth or ninth aspect of the invention, characterized in that the air flow generating unit puts ducts at the intake and exhaust units in communication with each other and in that a duct is formed by plural members in the vicinity of the member to be exposed.

According to a ninth aspect of the invention, there is provided an image forming apparatus having an image exposure unit provided under an image carrying body, characterized in that it has a dust protective member for preventing particles from sticking to at least a member located above an optical path of the image exposure unit by covering the top of the image exposure unit without blocking the optical path of the image exposure unit, an air flow generating unit for generating an air flow for preventing particles from entering the region covered by the dust protecting member and a shutter member which is provided below the path of the air flow and which can be moved to a position where it directly covers at least a member located above the optical path of the image exposure unit, in that the shutter member is moved to the position where it directly covers at least the member located above the optical path of the image exposure unit when the image forming apparatus is not operating and in that the shutter member is retracted from the position where it directly covers at least the member located above the optical path of the image exposure unit and an air flow is generated by the air flow generating unit when the image forming apparatus is in operation.

According to a tenth aspect of the invention, there is provided an image forming apparatus according to the eleventh aspect of the invention, characterized in that the air flow generating unit generates an air flow for a certain period of time after the shutter member is moved to the position where it directly covers at least the member located above the optical path of the image exposure unit.

According to an eleventh aspect of the invention, there is provided an image forming apparatus according to the eleventh or twelfth aspect of the invention, characterized in that the air flow generating unit generates an air flow which passes over an opening located at an upper end of the dust protective member.

According to a twelfth aspect of the invention, there is provided an image forming apparatus according to any of the eleventh through thirteenth aspects, characterized in that the air flow generating unit has an intake unit for taking air from one end of an elongate image carrying body in the longitudinal direction thereof and a rectifier plate for deflecting the direction of the air flow taken in by the intake unit in a substantially orthogonal direction to generate a substantially uniform air flow in the longitudinal direction of the image carrying body.

According to a thirteenth aspect of the invention, there is provided an image forming apparatus having plural image forming units with respective image carrying bodies on which toner images in different colors can be formed provided in parallel with each other and an image exposure unit for performing image exposure on the image carrying bodies of the plural image forming units provided under the image carrying bodies of the plural image forming units, characterized in that each of the image forming units has a dust protective member for preventing particles from sticking to at least a member located at an upper end of an optical path of the image exposure unit by covering the top of the image exposure unit without blocking the optical path of the image exposure unit and an air flow generating unit for generating an air flow which passes over an opening located at an upper end of the dust protective member; the air flow generating unit provided at the image forming units has an intake unit shared by the plural image forming units; the common intake unit is provided at one longitudinal end of an image carrying body of the image forming unit located at one end; and the area of the opening of ducts for supplying air from the common intake unit to the image forming units is greater on the side of the intake unit and smaller on the side opposite to the intake unit.

According to a fourteenth aspect of the invention, there is provided an image forming apparatus having plural image forming units with respective image carrying bodies on which toner images in different colors can be formed provided in parallel with each other and an image exposure unit for performing image exposure on the image carrying bodies of the plural image forming units provided under the image carrying bodies of the plural image forming units, characterized in that each of the image forming units has a dust protective member for preventing particles from sticking to at least a member located above an optical path of the image exposure unit by covering the top of the image exposure unit without blocking the optical path of the image exposure unit and an air flow generating unit for generating an air flow which passes over an opening located at an upper end of the dust protective member; the air flow generating unit provided at the image forming units has an intake unit shared by the plural image forming units; and an intake path of the common intake unit is provided on a diagonal line connecting the image forming units located on both ends.

According to a fifteenth or sixteenth aspect of the invention, the intake unit has a filter for removing particles, provided on the intake-side of the intake unit.

The air flow generating unit is an essential component of the present invention except for simplified dust protectors which may have only the dust protective member and shutter member.

According to the first aspect of the invention, the dust protective member can prevent particles from sticking to at least the member located above the optical path of the image exposure device, and the air flow generating unit can prevent particles from entering the region covered by the dust protective member by generating an air flow that prevents particles from entering the region covered by the dust protective member. Further, since the air flow does not directly contact the image exposure device, no condensation of atmospheric moisture occurs on the device.

The air flow prevents particles from entering the region covered by the dust protective member and does not directly contact the image exposure unit. Therefore, even if air is taken in only with the intake unit, it will never scatter dust around the image exposure unit to dirt or damage the image exposure device.

According to the second aspect of the invention, the air flow generating unit is configured such that it generates an air flow which passes over an opening located at an upper end of the dust protective member, which ensures the same effects as those achieved in the first aspect of the invention.

According to the third aspect of the invention, even when the air flow is stopped, it is possible to reliably prevent particles that enter through the opening of the dust protective member from sticking to at least the member located above the optical path of the image exposure device by closing the shutter member.

According to the fourth aspect of the invention, even in the configuration in which the air flow for preventing particles from entering the region covered by the dust protective member is generated by the air flow generating unit, it is possible to reliably prevent the pressure above the opening at the upper end of the dust protective member from becoming, for example, zero negative pressure to attract particles in the neighborhood thereof.

According to the fifth aspect of the invention, even when the air flow generating unit is configured to take in or exhaust air at one longitudinal end of a member to be exposed, a substantially uniform air flow can be generated by the rectifier plate in the longitudinal direction of the member to be exposed, which makes it possible to prevent the dust protective effect from becoming insufficient when, for example, the air flow is weak even in part and to thereby ensure the dust protective effect achieved by the air flow.

According to the sixth aspect of the invention, while intake or exhaust of air is normally weak on the side of the intake or exhaust unit, since the opening areas of the spaces separated by the rectifier plates at the end where the intake or exhaust unit is located are gradually changed, air can be sufficiently taken in or exhausted on the side of the intake or exhaust unit. Consequently, it is possible to generate a substantially uniform air flow in the longitudinal direction of a member to be exposed.

According to the seventh aspect of the invention, since an air flow passes through the microscopic gap at an increased speed, the air flow at a high flow rate makes it possible to reliably prevent particles from entering the dust protective member.

According to the eighth aspect of the invention, some of the ducts of the air flow generating unit for circulating an air flow are not necessarily real ducts, but they may be substituted with plural members such as charging members and developers in the vicinity of the member to be exposed. This makes it possible to prevent the configuration of the ducts of the air flow generating unit from becoming complicated and to prevent any increase in the number of parts.

According to the ninth aspect of the invention, it is possible to reliably prevent particles from sticking to the image exposure unit with the shutter member when the image forming apparatus is not operating and to reliably prevent particles from sticking to the image exposure unit with the air flow generating unit when the image forming apparatus is in operation.

According to the tenth aspect of the invention, it is possible not only to reliably prevent particles from sticking to the image exposure unit with the shutter member but also to reliably prevent particles from sticking to the shutter member by generating an air flow for a certain period of time after the shutter member is moved.

According to the eleventh aspect of the invention, the same effect as in the second aspect of the invention can be achieved.

According to the twelfth aspect of the invention, the same effect as in the fifth aspect of the invention can be achieved.

According to the thirteenth aspect of the invention, while the intake of air is normally weak on the side of the intake unit, air can be sufficiently taken into the image forming unit on the side of the intake unit by setting a larger opening area for the duct on the side of the intake unit. This consequently makes it possible to reliably generate a substantially uniform air flow throughout plural image forming units.

According to the fourteenth aspect of the invention, the intake path of the common intake unit located on the diagonal line makes it possible to generate a well-balanced air flow in the plural image forming unit.

BRIEF DESCRIPTION OF THE DRAWING

FIG. 17A is a table showing conditions for an experiment;

FIG. 17B is a schematic configuration diagram showing the conditions for the experiment;

FIG. 23A is a table showing results of an experiment;

FIG. 24A is a table showing results of an experiment;

DETAILED DESCRIPTION OF PREFERRED EMBODIMENTS

Preferred embodiments of the invention will now be described with reference to the drawings.

A first embodiment of the invention will be described.

Figure 2:
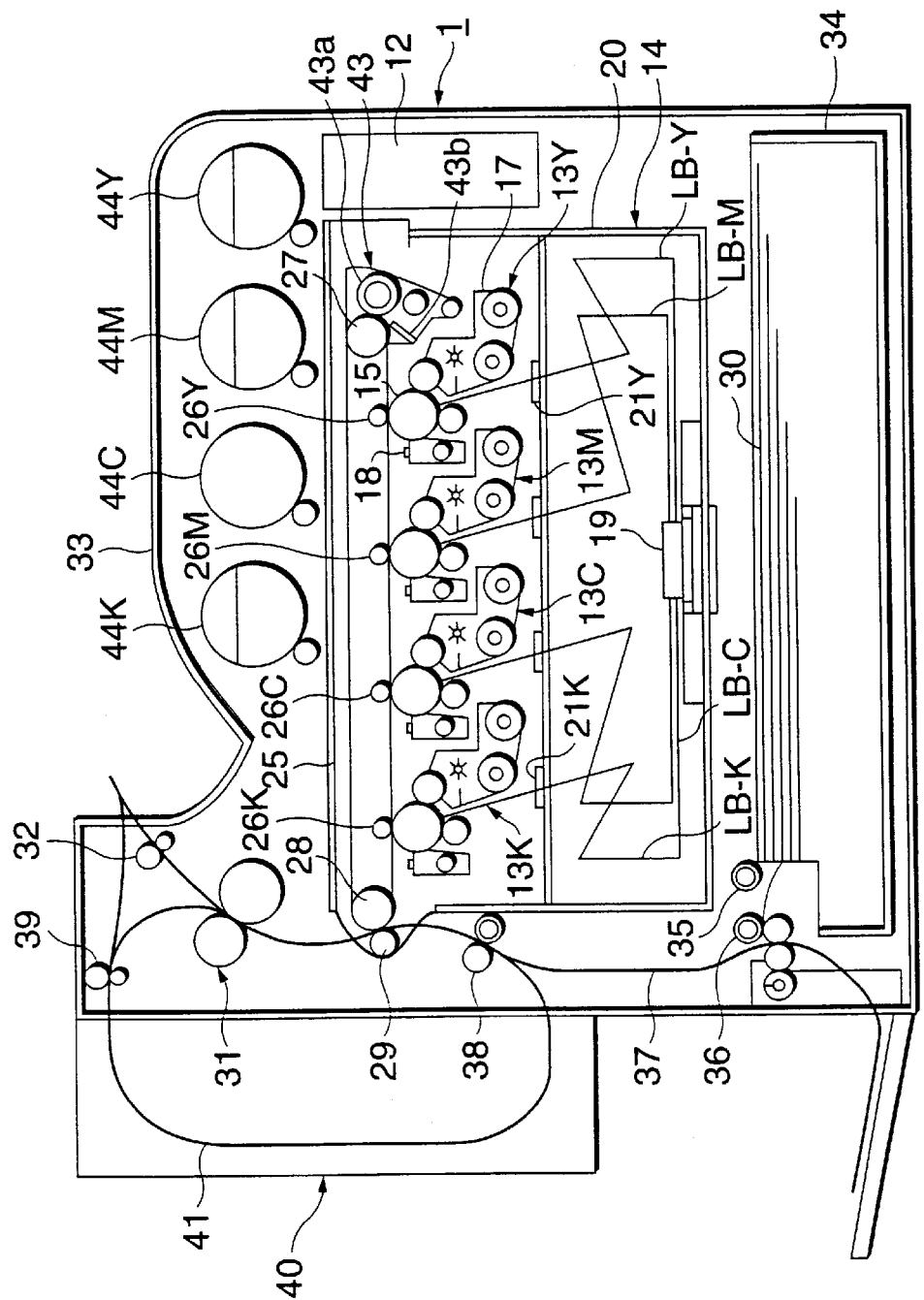
FIG. 2 illustrates a configuration of an image forming apparatus utilizing the dust protector for an image exposure device according to the first embodiment of the invention.
Figure 3:
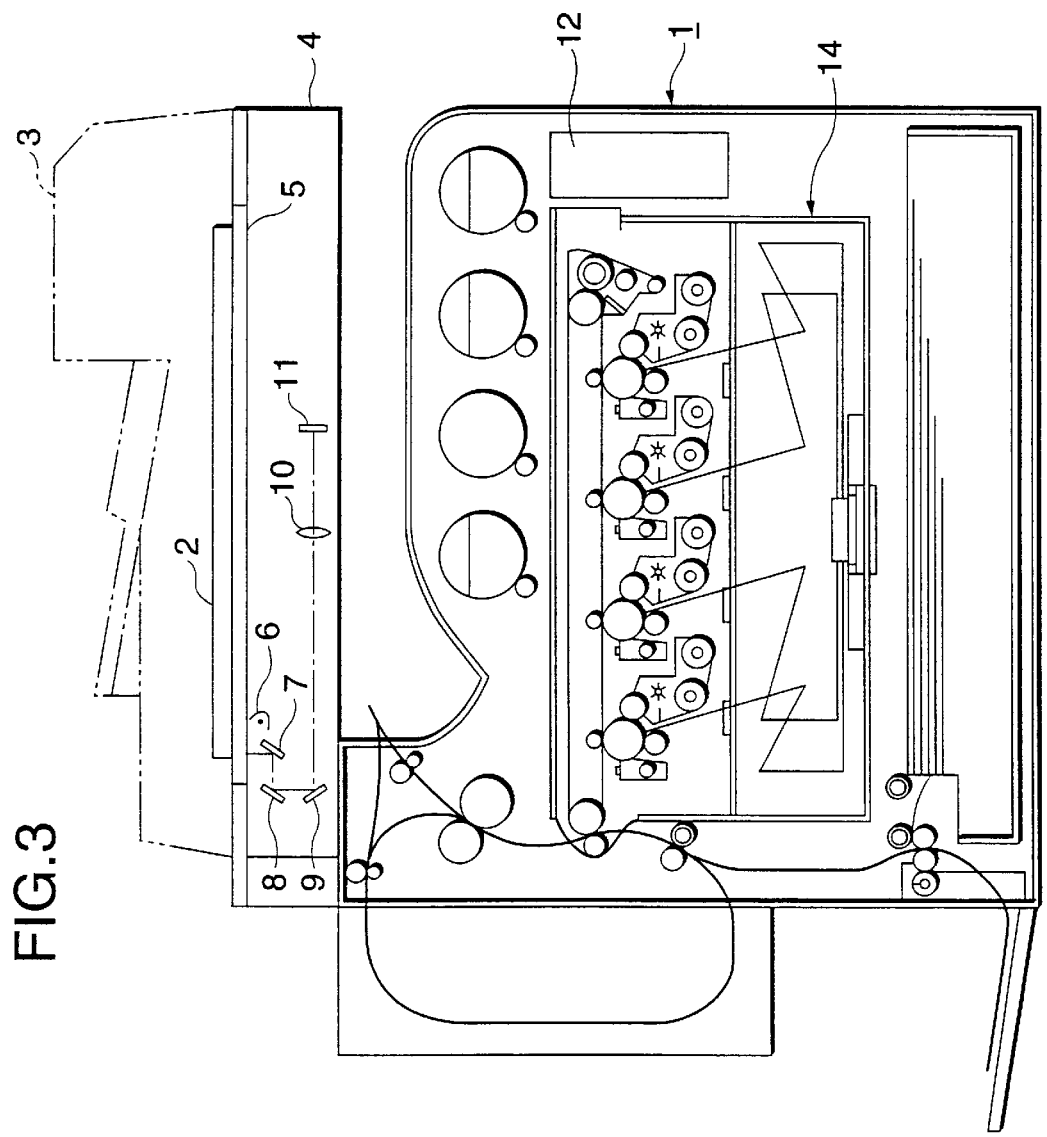
FIG. 3 illustrates a configuration of an image forming apparatus utilizing a dust protector for an image exposure device according to the first embodiment of the invention.

FIG. 2 illustrates a tandem type digital color printer as an image forming apparatus utilizing a dust protector for an image exposure device according to a first embodiment of the invention. FIG. 3 illustrates a tandem type digital color copying machine as an image forming apparatus utilizing a dust protector for an image exposure device according to the first embodiment of the invention.

Reference number 1 represents main bodies of the tandem type digital color printer and printer in FIGS. 2 and 3, respectively. In the case of the digital copying machine, as shown in FIG. 3, an automatic document feeder (ADF) 3 for automatically transporting documents 2 one by one separately and a document reader 4 for reading images of the documents 2 transported by the automatic document feeder 4 are disposed on top of the main body 1. In the document reader 4, a document 2 placed on a platen glass 5 is illuminated by a light source 6; optical images reflected from the document 2 are scanned through an reducing optical system formed by a full rate mirror 7, half rate mirrors 8 and 9 and an imaging lens 10 on an image reading device 11 constituted by a CCD or the like and are exposed thereon; and the image reading device 11 reads reflected optical images of color materials on the document 2 in a predetermined dot density (e.g., 16 dots/mm).

The reflected optical images of color materials on the document 2 read by the document reader 4 are sent to an IPS (image processing system) 12 as document reflectivity data in three colors, e.g., red (R), green (G) and blue (B) in eightbits each. At the IPS 12, the reflectivity data of the document 2 are subjected to predetermined image processes such as shading correction, misalignment correction, lightness/color space conversion, gamma correction, frame elimination and color moving and editing. The IPS 12 performs predetermined color processes also on image data sent thereto from a personal computer and the like.

The image data subjected to the predetermined image processes at the IPS 12 as described above are converted also by the IPS 12 into tone data of color materials for document reproduction in four colors, i.e., yellow (Y), magenta (M), cyan (C) and black (K) in eight bits each. As detailed below, the data are respectively sent to an ROS (raster output scanner) 14 for image forming units 13Y, 13M, 13C and 13K for respective colors yellow (Y), magenta (M), cyan (C) and black (K). The ROS 14 as an image exposure device performs image exposure using laser beams LB according to tone data of color materials for document reproduction in predetermined colors.

As shown in FIGS. 2 and 3, the four image forming units 13Y, 13M, 13C and 13K for yellow (Y), magenta (M), cyan (C) and black (K) are provided in parallel with each other in the horizontal direction at constant intervals inside the main bodies of the tandem type digital color printer and copying machine 1.

All of the four image forming units 13Y, 13M, 13C and 13K are identical in configuration and are generally formed by a photosensitive drum 15 as an image carrying body rotated at a predetermined speed, a charging roll 16 for primary charging that uniformly charges the surface of the photosensitive drum 15, an ROS 14 as an image exposure device for exposing an image associated with a predetermined color on the surface of the photosensitive drum 15 to form an electrostatic latent image, a developer 17 for developing the electrostatic latent image formed on the photosensitive drum 15 with a toner in the predetermined color and a cleaner 18 for cleaning the surface of the photosensitive drum 15.

As shown in FIGS. 2 and 3, the ROS 14 is configured to be shared by the four image forming units 13Y, 13M, 13C and 13K. It modulates four semiconductor lasers (not shown) according to tone data of color materials for document reproduction in respective colors to cause the semiconductor lasers to emit laser beams LB-Y, LB-M, LB-C and LB-K in accordance with the tone data. The ROS 14 may obviously be configured for each of plural image forming units. The laser beams LB-Y, LB-M, LB-C and LB-K emitted by the semiconductor lasers are projected upon a polyhedral mirror 19 through an f-θ lens (not shown) to be polarized and scanned by the polyhedral mirror 19. The laser beams LB-Y, LB-M, LB-C and LB-K polarized and scanned by the polyhedral mirror 19 are scanned and exposed on the photosensitive drum 15 from below at an angle through plural reflecting mirrors (not shown).

Since the ROS 14 scans and exposes images on the photosensitive drum 15 from below as shown in FIG. 2, the ROS 14 can be dirted or damaged by toner and the like that drop on same from the developers 17 of the four image forming units 13Y, 13M, 13C and 13K located above the same. For this reason, the ROS 14 is tightly enclosed by a frame 20 in the form of a rectangular parallelepiped, and windows 21Y, 21M, 21C and 21K made of transparent glass as shield member are provided on top of the frame 20 to expose the four laser beams LB-Y, LB-M, LB-C and LB-K on the photosensitive drum 15. The windows 21Y, 21M, 21C and 21K made of glass are members which are located highest on the optical path of laser beam LB from the ROS 14 as an image exposure device.

The IPS 12 sequentially outputs image data in each color to the ROS 14 shared by the image forming units 13Y, 13M, 13C and 13K for the respective colors yellow (Y), magenta (M), cyan (C) and black (K), and laser beams LB-Y, LB-M, LB-C and LB-K emitted by the ROS 14 in accordance with the image data are scanned and exposed on the surfaces of the respective photosensitive drums 15 to form electrostatic latent images thereon. The electrostatic latent images formed on the photosensitive drums 15 are developed by the developers 17Y, 17N, 17C and 17B into toner images in the respective colors yellow (Y), magenta (N), cyan (C) and black (K).

The toner images in the respective colors yellow (Y), magenta (N), cyan (C) and black (K) sequentially formed on the photosensitive drums 15 of the image forming units 13Y, 13M, 13C and 13K are transferred on a multiplex basis to an intermediate transfer belt 25 provided above the image forming units 13Y, 13M, 13C and 13K by primary transfer rolls 26. The intermediate transfer belt 25 is stretched between a drive roll 27 and a backup roll 28 with a predetermined tension and is driven for circulation at a predetermined speed in the direction of the arrow by the drive roll 27 which is driven for rotation by a dedicated driving motor (not shown) having an excellent property of maintaining a constant speed. For example, the intermediate transfer belt 25 used is an endless belt which is provided by forming a synthetic resin film such as PET having flexibility into a band-like configuration and by connecting both ends of the band-shaped synthetic resin film by means of welding or the like.

The toner images in the respective colors yellow (Y) magenta (M), cyan (C) and black (K) transferred on a multiplex basis to the intermediate transfer belt 25 are subjected to secondary transfer to transfer paper 30 with an urging force and an electrostatic force supplied by a secondary transfer roll 29 which is urged into contact with the backup roll 28, and the transfer paper 30 having the color toner images transferred thereon is transported to a fixer 31 located above the same. The secondary transfer roll 29 is urged into contact with the backup roll,28 on one side thereof to perform secondary transfer of the color toner images onto the transfer paper 30 transported upward. The transfer paper 30 having the color toner images transferred thereon is subjected to a fixing process at the fixer 31 using heat and pressure and is thereafter discharged on to a discharge tray 33 provided on top of the main body 1 by a discharge roll 32.

As shown in FIGS. 2 and 3, the transfer paper in a predetermined size is transported from a paper supply cassette 34 to a register roller 38 through a paper transport path 37 by a paper supply roller 35 and a pair of rollers 36 for separating and transporting sheets of paper and is temporarily stopped at the register roller 38. The transfer paper 30 supplied from the paper supply cassette 34 is fed to a secondary transfer position on the intermediate transfer belt 35 by the register roller 38 which rotates at predetermined timing.

When the digital color printer or copying machine is to make a full color double-sided copy, the transporting direction of transfer paper 30 having an image fixed on one side thereof is switched by a switching gate (not shown) instead of discharging the paper directly on to the discharge tray 33 with the discharge roll 32 to transport the paper to a transport unit 40 for double-side processing through a pair of paper transport rollers 39. In the transport unit 40 for double-side processing, a pair of transport rollers (not shown) provided along a transport path 41 transport the transfer paper 30 which has been inverted upside down again to the register roller 38, and the transfer paper 30 is discharged on to the discharge tray 33 after an image is transferred to and fixed on the back side thereof.

Reference numerals 44Y, 44M, 44C and 44K in FIGS. 2 and 3 respectively represent toner cartridges for supplying toners in predetermined colors to the developers 17 for colors yellow (Y), magenta (M), cyan (C) and black (K).

Figure 4:
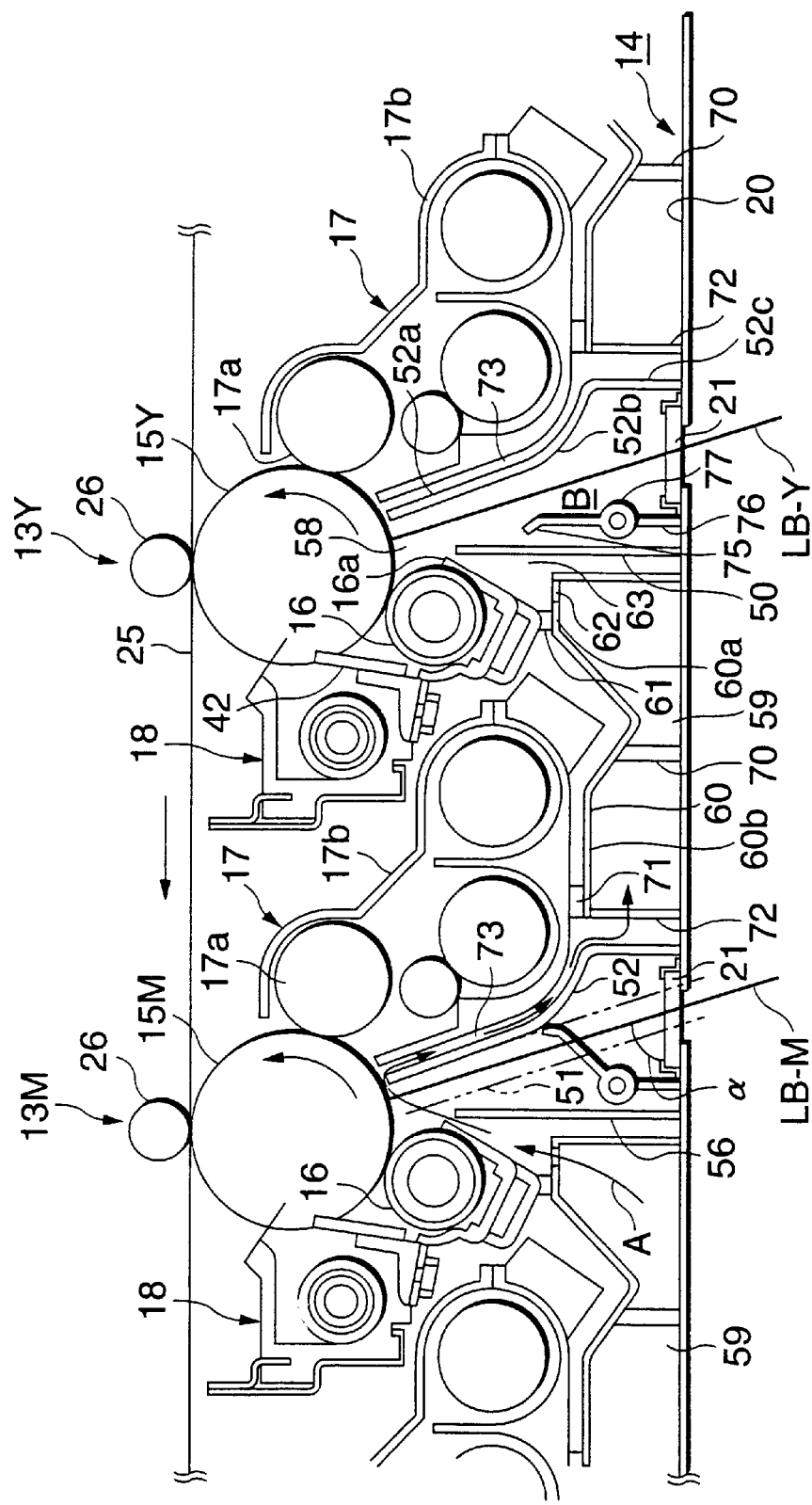
FIG. 4 illustrates a configuration of major parts of an image forming apparatus utilizing a dust protector for an image exposure device according to the first embodiment of the invention.

FIG. 4 illustrates the image forming units in each of the digital color printer and copying machine.

As shown in FIG. 4, the four image forming units 13Y, 13M, 13C and 13K for yellow, magenta, cyan and black are identical in configuration and are configured to sequentially form toner images in yellow, magenta, cyan and black respectively at predetermined timing as described above. As described above, the image forming units 13Y, 13M, 13C and 13K for the respective colors have the photosensitive drum 15, and the surfaces of the photosensitive drums 15 are uniformly charged by the charging rolls 16 for primary charging. Thereafter, the surfaces of the photosensitive drums 15 are exposed by scanning laser beams LB for image formation emitted by the ROS 14 according to image data thereon to form electrostatic latent images in respective colors. The laser beams LB to scan and expose the photosensitive drums 15 are set such that they expose the photosensitive drums 15 from positions shifted to the right from the positions directly below the drums at a predetermined inclination α. The electrostatic latent images formed on the photosensitive drums 15 are respectively developed with toners in yellow, magenta, cyan and black by developing rolls 17a of the developers 17 of the image forming units 13Y, 13M, 13C and 13K to provide visible toner images, the visible toner images are sequentially transferred on to the intermediate transfer belt 25 on a multiplex basis because of charging with the primary transfer rolls 26.

Residual toner, paper particles and the like on the surfaces of the photosensitive drums 15 on which the toner image transfer process has been completed are removed by the cleaners 18 in preparation for the next image forming process. The cleaners 18 have a cleaning blade 42. The cleaning blades 42 remove residual toner, paper particles and the like on the photosensitive drums 15. As shown in FIGS. 2 and 3, residual toner, paper particles and the like on the surface of the intermediate transfer belt 25 on which the toner image transfer process has been completed are removed by the cleaner 43 in preparation for the next image forming process. The cleaner 43 has a cleaning brush 43a and a cleaning blade 43b. The cleaning brush 43a and cleaning blade 43b remove residual toner, paper particles and the like on the intermediate transfer belt 25.

The first embodiment has a configuration including a dust protective member for preventing particles from sticking to at least a member located above an optical path of an image exposure device by covering the image exposure device from above without blocking the optical path of the image exposure device and an air flow generating unit for forming an air flow for preventing particles from entering the region covered by the dust protective member. Further, the air flow generating unit is configured such that it generate an air flow which passes over an opening located at an upper end of the dust protective member.

In the tandem type digital color printer and copying machine according to the present embodiment, as shown in FIG. 4, a first baffle 50 as a dust protective member is vertically erected in a position on an supper surface of the frame 20 of the ROS 14 which is substantially directly under each of the photosensitive drum 15. The first baffle 50 may be provided such that an upper part which is ⅔ of the entire length is inclined toward an optical path 51 of the laser beam LB. The first baffle 50 is provided such that the upper end thereof defines a large gap between the surface of the photosensitive drum 15 and itself. An inclined second baffle 52 as a dust protective member is erected in a position on the upper surface of the frame 20 of the ROS 14 such that it faces the first baffle 50 with the optical path 51 of the laser beam LB from the ROS 14 extending between them, and the window 21 of the ROS 14 is covered by the first and second baffles 50 and 52. The second baffle 52 is constituted by an upper end portion 52a provided in parallel with the optical path 51 of the laser beam LB, an intermediate portion 52b which is smoothly continuous to the upper end portion 52b and which is curved in compliance with an outer wall of the developer 17 and a lower end portion 52c which is formed by bending the intermediate portion 52b such that it is vertically erected. The first baffle 50 and second baffle 52 are configured such that they prevent particles from sticking to the window 21 which is a member located above the optical path 51 of the ROS 14 by covering the window 21. An opening 58 is defined between the upper ends of the first baffle 50 and second baffle 52 such that the optical path 51 is not blocked. A microscopic gap G (for example, on the order of 2 mm) is defined between the upper and of the second baffle 52 and the surface of the photosensitive drum 15 as shown in FIG. 1 to form an air flow A which passes through the gap G as described below.

The first embodiment is also configured with an air flow generating unit for generating the air flow A for preventing particles from entering a region B covered by the dust protective member as described above. More specifically, the air flow generating unit is configured such that it generates an air flow which passes over the opening located at the upper ends of the dust protective members. The air flow generating unit has an intake unit shared by plural image forming units; the common intake unit is provided at one longitudinal end of an image carrying body of the image forming unit located at one end; and the area of the opening of ducts for supplying air from the common intake unit to the image forming units is greater on the side of the intake unit and smaller on the side opposite to the intake unit.

Figure 5:
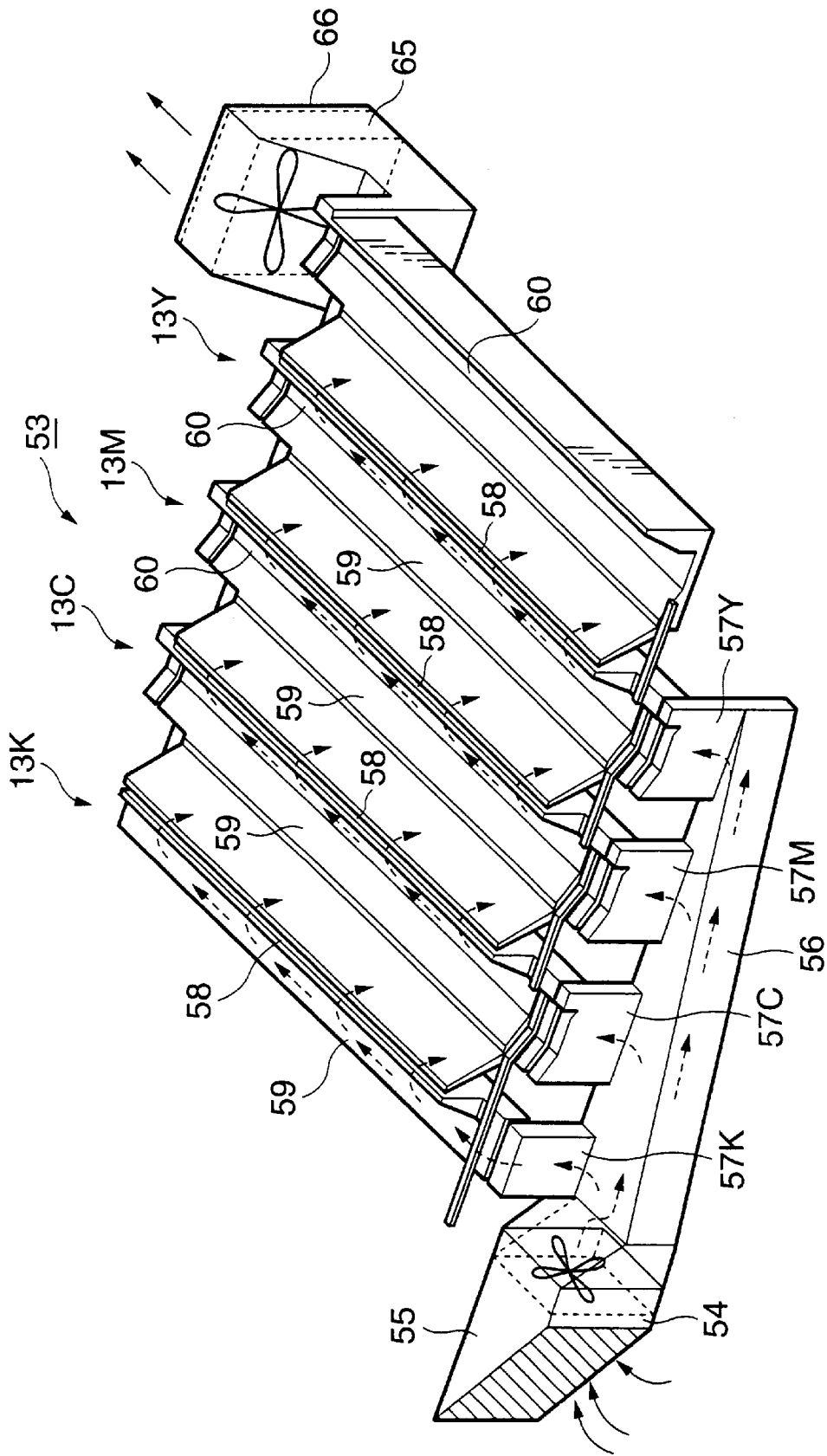
FIG. 5 is an external perspective view of the dust protector for an image exposure device according to the first embodiment of the invention.
Figure 6:
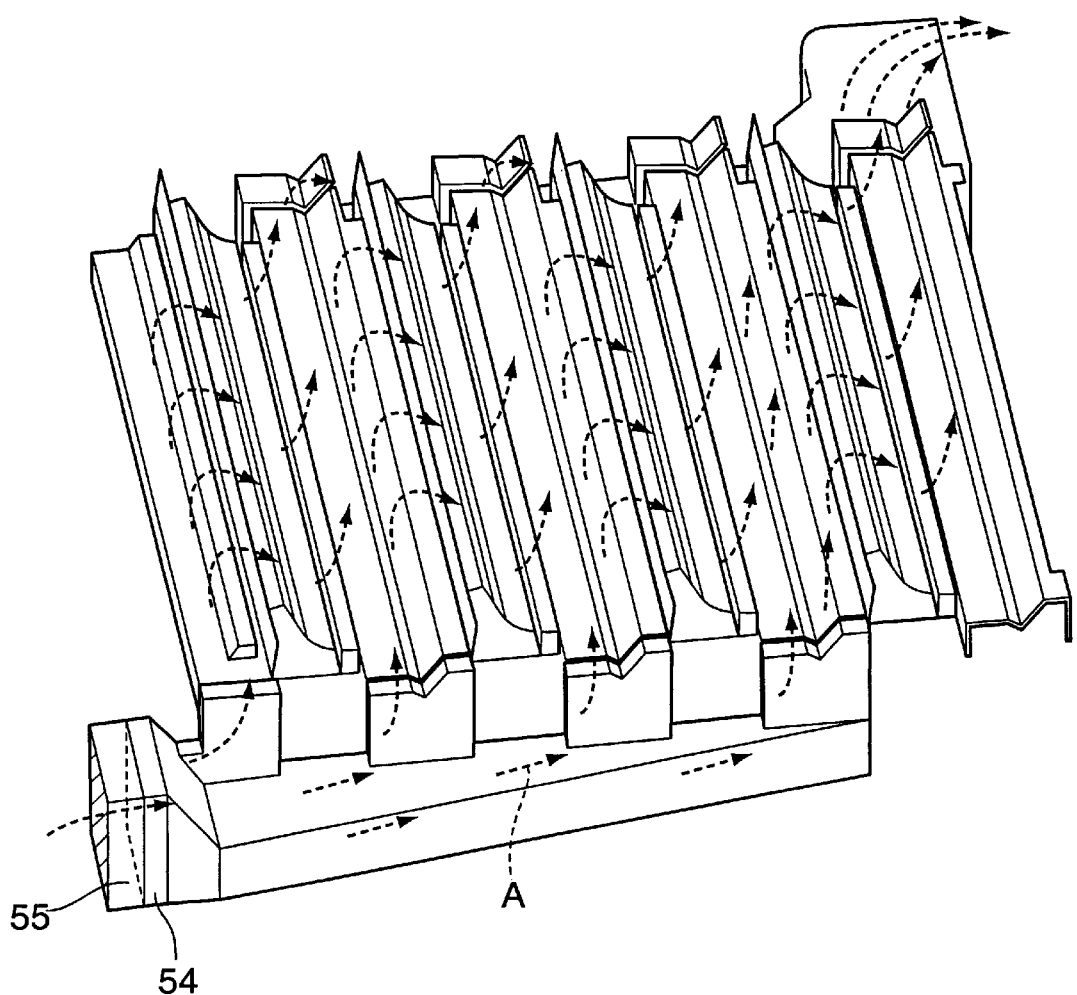
FIG. 6 is an external perspective view of the dust protector for an image exposure device according to the first embodiment of the invention.

As shown in FIGS. 5 and 6, the air flow generating unit 53 has an intake fan 54 as the intake unit at one end thereof toward the front side of the printer or copying machine main body 1 (the end thereof on the side of the black image forming unit 13K in the illustrated example), and a filter 55 for eliminating dust and the like is provided at the entrance side of the intake fan 54. Connected to the intake fan 54 is an intake duct 56 which is provided in front of the four image forming units 13Y, 13M, 13C and 13K such that it extends from the black image forming unit 13K up to the yellow image forming unit 13Y. The intake duct 56 is substantially formed in an elongate triangular configuration as viewed from above, and the opening area of the intake duct 56 is set greater on the side of the intake fan 54 and smaller on the side opposite to the intake fan 54. Flat ducts 57Y, 57M, 57C and 57K having a rectangular frontal configuration for taking air into the respective image forming units 13Y, 13M, 13C and 13K for yellow (Y), magenta (M), cyan (C) and black (K) are vertically provided in connection to the intake duct 56. Openings are provided on the upper ends of the ducts 57Y, 57M, 57C and 57K to take air into the respective image forming units 13Y, 13M, 13C and 13K from this side toward the further side in the longitudinal direction thereof.

Figure 1:
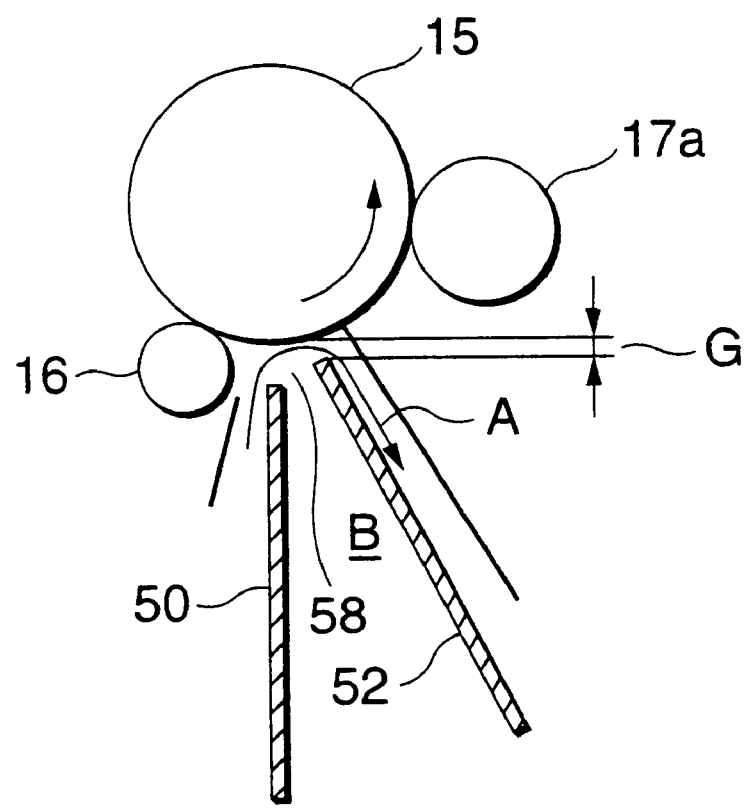
FIG. 1 illustrates a configuration of major parts of an image forming apparatus utilizing a dust protector for an image exposure device according to a first embodiment of the invention.

As shown in FIGS. 1 and 5, intake paths 59 for generating air flows A across openings 58 located at upper ends of the first and second baffles 50 and 52 are provided between the image forming units 13Y, 13M, 13C and 13K for yellow (Y), magenta (M), cyan (C) and black (K) and on the left side of the image forming unit 13K for black (K). As shown in FIG. 4, the intake paths 59 are formed by the frame 20 of the ROS 14 and path forming members 60 attached to the top of the same. Ends 60a of the path forming members 60 toward the photosensitive drums 15 (right-hand side in FIG. 4) are set at a height at which it is located under support members 16a surrounding the charging rolls 16, and the gaps between ends 60a of the path forming members 60 and the support members 16a for the charging rolls 16 are sealed with seal members 61. Openings 62 are provided at the ends 60a of the path forming members 60 inside the seal members 61. The support members 16a for the charging rolls 16, the ends 60a of the path forming members 60 and the first baffles 50 define air flow generating ducts 63 for generating air flows A upstream of the exposure positions of the photosensitive drums 15.

Figure 7:
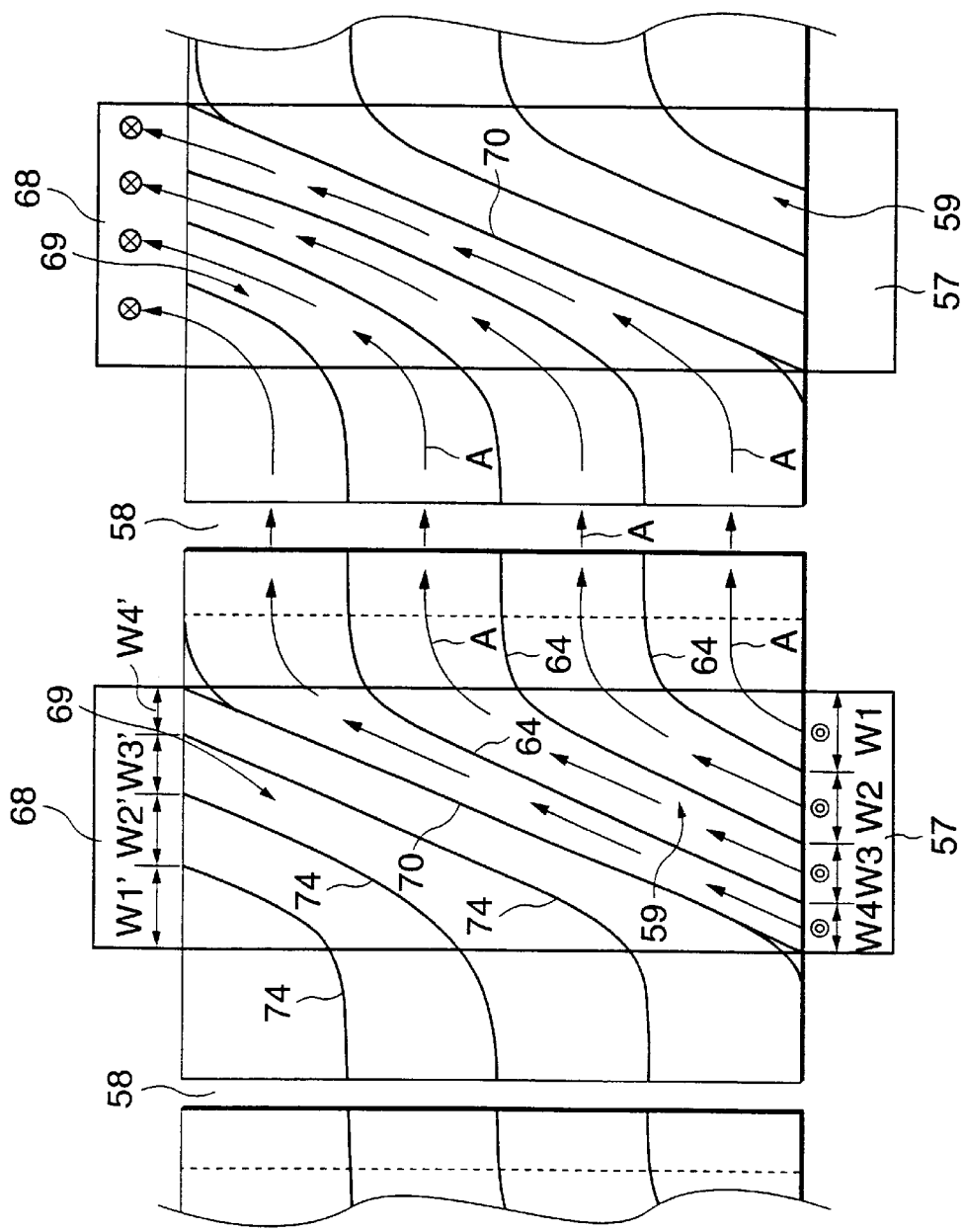
FIG. 7 is an illustration of air flows in the dust protector for an image exposure device according to the first embodiment of the invention.

As shown in FIG. 7, rectifier plates 64 for generating substantially uniform air flows A in the longitudinal direction of the photosensitive drums 15 are provided inside the intake paths 59 and the air flow generating ducts 63. Those rectifier plates 64 have an opening width w which is tapered from a greatest value at the intake side of the first baffles 50 to generate substantially uniform air flows A in the longitudinal direction of the photosensitive drums 15. The openings of the rectifier plates 64 at the exit side are all set at the same width.

According to the first embodiment, the air flow generating unit has an exhaust unit shared by the plural image forming unit; the common exhaust unit is provided at one longitudinal end of an image carrying body of the image forming unit located at an end; and the area of the opening of ducts for exhausting air from the image forming units with the common exhaust unit is greater on the side of the exhaust unit and smaller on the side opposite to the exhaust unit.

Figure 8:
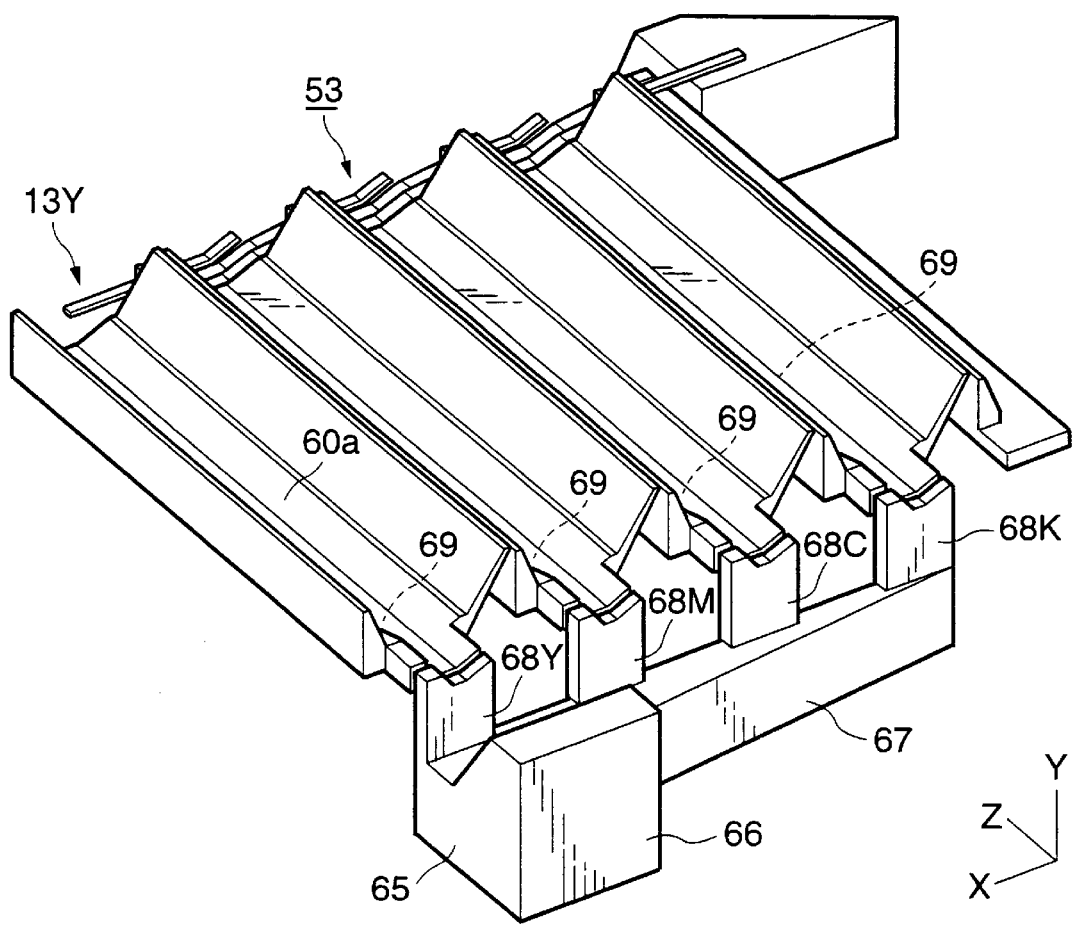
FIG. 8 is an external perspective view of a dust protector for an image exposure device according to the first embodiment of the invention.
Figure 9:
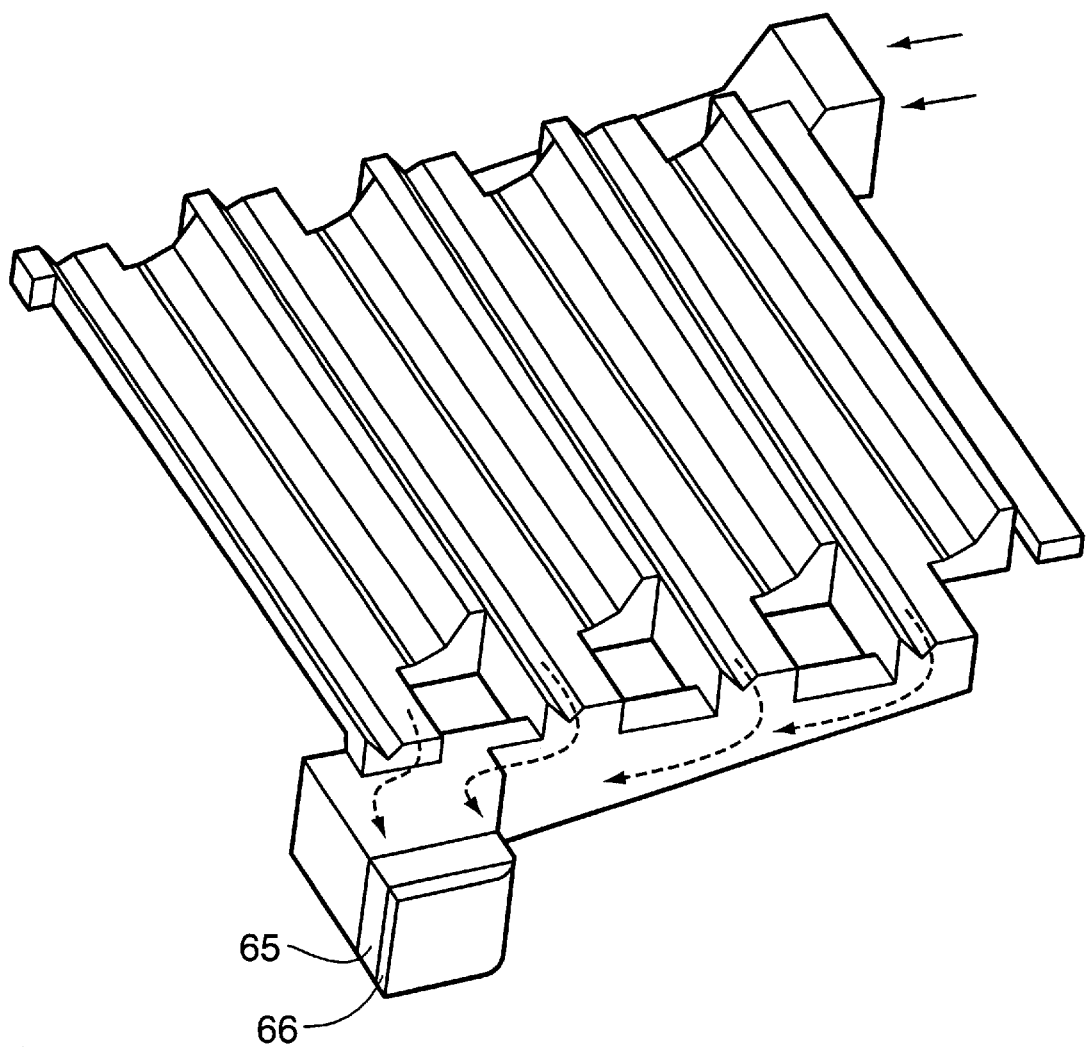
FIG. 9 is an external perspective view of the dust protector for an image exposure device according to the first embodiment of the invention.

As shown in FIGS. 8 and 9, the air flow generating unit 53 has an exhaust fan 65 as the exhaust unit at one end thereof toward the further side of the printer or copying machine main body 1 (the end thereof on the side of the yellow image forming unit 13Y on the left side of FIG. 8), and a filter 66 for eliminating dust and the like is provided at the exit side of the exhaust fan 65. Connected to the exhaust fan 65 is an exhaust duct 67 which is provided on the further side of the four image forming units 13Y, 13M, 13C and 13K such that it extends from the yellow image forming unit 13Y up to the black image forming unit 13B. The exhaust duct 67 is substantially formed in an elongate triangular configuration as viewed from above, and the opening area of the exhaust duct 67 is set greater on the side of the exhaust fan 65 and smaller on the side opposite to the exhaust fan 65. Flat ducts 68Y, 68M, 68C and 68K having a rectangular frontal configuration for exhausting air from the respective image forming units 13Y, 13M, 13C and 13K for yellow (Y), magenta (M), cyan (C) and black (K) are vertically provided in connection to the exhaust duct 67. Openings are provided on the upper ends of the ducts 68Y, 68M, 68C and 68K to exhaust air from the respective image forming units 13Y, 13M, 13C and 13K from the further side toward the this side in the longitudinal direction thereof.

As shown in FIGS. 8, an exhaust path 69 for generating an air flow A across the opening 58 located at the upper ends of the first and second baffles 50 and 52 is provided at one end of the image forming unit 13Y for yellow (Y) (the end on the left-hand side in FIG. 8). Exhaust paths 69 are formed between the image forming units 13Y, 13M, 13C and 13K for yellow (Y), magenta (M), cyan (C) and black (K) such that they equally share the spaces between the adjoining image forming units 13Y, 13M, 13C and 13K with the intake paths 59. As shown in FIG. 4, the exhaust paths 69 are formed by the frame 20 of the ROS 14 and path forming members 60 attached to the top of the same similarly to the intake paths 59. As shown in FIG. 7, the spaces surrounded by the frame 20 of the ROS 14 and the path forming members 60 are separated by partition plates 70 into the intake paths 59 and exhaust paths 69. As shown in FIG. 4, ends 60b of the path forming members 60 toward the developers 17 are disposed along the bottom of the developers 17, and the gaps between ends 60b and housings 17b of the developers 17 are sealed with seal members 71. Openings 72 are provided at vertical portions of the ends 60b of the path forming members 60 inside the seal members 71. The housings 17b of the developers 17, the ends 60b of the path forming members 60 and the second baffles 52 define air flow generating ducts 73 for generating air flows A to exhaust air from the upstream side of the exposure positions of the photosensitive drums 15 to the downstream side.

As shown in FIG. 7, three rectifier plates 74 for generating substantially uniform air flows A in the longitudinal direction of the photosensitive drums 15 are provided inside the exhaust paths 69 and the air flow generating ducts 73. Those rectifier plates 74 have an opening width w' which is tapered from a greatest value near the exhaust side of the second baffles 52 (w1'>w2'>w3'>w4') to generate substantially uniform air flows A in the longitudinal direction of the photosensitive drums 15. The openings of the rectifier plates 74 at the entrance side are all set at the same width.

According to the first embodiment, the air flow generating unit 53 is set such that substantially zero static pressure is generated above the openings 58 at the upper ends of the first and second baffles 50 and 52 and such that a positive pressure and a negative pressure are generated upstream and downstream of the openings 58 respectively. The air quantities of the intake fan 54 and exhaust fan 60 of the air flow generating unit 53 are set such that substantially zero static pressure is generated above the openings 58 at the upper ends of the first and second baffles 50 and 52 and such that a positive pressure and a negative pressure are generated upstream and downstream of the openings 58 respectively. As shown in FIG. 1, microscopic gaps G (for example, on the order of 2 mm) located at the upper ends of the second baffles 52 are set, for example, such that air flows A at an air speed of 0.42 m/s.

Further, the first embodiment has a configuration including a shutter member which is located below the paths of the air flows and which can be moved to a position where it can directly cover at least a member located above the optical path of the image exposure unit. The shutter member is moved to the position where it directly covers at least the member located above the optical path of the image exposure unit when the image forming apparatus is not operating, and the shutter member is retracted from the position where it directly covers at least the member located above the optical path of the image exposure unit and air flows are generated by the air flow generating unit when the image forming apparatus is in operation. The air flow generating unit is also configured such that it generates air flows for a certain period of time after the shutter member is moved to the position where it directly covers at least a member located above the optical path of the image exposure device.

As shown in FIG. 4, openable and closable shutters 75 are provided between regions B surrounded by the first baffles 50 and second baffles 52. The shutters 75 are attached to upper ends of short support members 76 vertically erected on the left side of the windows 21 such that they can be rotated about a central axis 77. The shutters 75 are configured such that they are driven for rotation by a driving unit such as a solenoid (not shown) provided at an end of the central axis 77 to be opened and closed at predetermined timing. As shown on the left-hand side of FIG. 4, the shutters 75 are moved to positions where they directly cover the windows 21 of the ROS 14 when the printer or copying machine is not operating. As shown on the right-hand side of FIG. 4, when the printer of copying machine is in operation, they are retracted from the positions where they directly cover the windows 21 of the ROS 14, the air flow generating unit 53 generates air flows A. The air flow generating unit 53 is set such that it generates air flows A for a certain period of time after the shutters 75 are moved to the positions where they directly cover the windows 21 of the ROS 14.

With the above-described configuration, the tandem type digital color printer and copying machine according to the present embodiment are free from moisture condensation which is a result of direct exposure of the windows and the like of the image exposure device and free from dirt on the shutter members provided in the vicinity of the windows and the like as needed. According to the present embodiment, by blowing the windows of the image exposure device and the like with a blower, dust around the windows and the like is scattered, which eliminates the possibility of dirt and damage on the windows and the like. Further, the present embodiment makes it possible to prevent particles from entering the image exposure device through the openings of the dust protective members.

Specifically, the tandem type digital color printer and copying machine according to the present embodiment perform the formation of full color images in which, as shown in FIGS. 2 through 4, toner images in predetermined colors formed by the image forming units 13Y, 13M, 13C and 13K for yellow (Y), magenta (M), cyan (C) and black (K) are transferred on a multiplex basis on to the intermediate transfer belt 25; the toner images in four colors transferred on a multiplex basis on to the intermediate transfer belt 25 are thereafter transferred on to the transfer paper 30 by the secondary transfer rolls 29 at a time; and the toner images are then fixed by the fixer 31 using heat and pressure and discharged on to the discharge tray 33 or in which toner images are alternatively transferred to and fixed on both sides of the transfer paper 30 through the transport unit 40 for double-side processing; and the paper is discharged on to the discharge tray 33.

As shown in FIGS. 2 through 4, the tandem type digital color printer and copying machine according to the present embodiment have a configuration in which the image forming units 13Y, 13M, 13C and 13K for yellow (Y), magenta (M), cyan (C) and black (K) sequentially form toner images in predetermined colors; the toner images are temporarily transferred on a multiplex basis on to the intermediate transfer belt 25; and the images are thereafter transferred on to the transfer paper 30 at a time. Therefore, it is obviously possible to form full color images at a high speed. In addition, since toner images in four colors are transferred on to the transfer paper 30 after being temporarily transferred on to the intermediate transfer belt 25 on a multiplex basis, the embodiment is characterized in that high quality full color images can be formed regardless of the type of the transfer material such as the transfer paper 30.

As shown in FIGS. 2 and 3, the tandem type digital color printer and copying machine according to the present embodiment have a configuration in which the intermediate transfer belt 25 is disposed above the image forming units 13Y, 13M, 13C and 13K for yellow (Y), magenta (M), cyan (C) and black (K) and in which the ROS 14 as an image exposure device is disposed under the image forming units 13Y, 13M, 13C and 13K. The present embodiment is therefore also characterized in that the digital color printer and copying machine can be significantly compact because the ROS 14 can be shared; the image forming units 13Y, 13M, 13C and 13K themselves can be made compact; the path of movement of the intermediate transfer belt 25 can be short; and the transport path 37 of the transfer paper 30 can be vertical instead of being horizontal.

However, in the tandem type digital color printer and copying machine according to the present embodiment, as shown in FIGS. 2 and 3, the ROS 14 as an image exposure device is disposed under the image forming units 13Y, 13M, 13C and 13K for yellow (Y), magenta (M), cyan (C) and black (K). Therefore, toner and the like can drop from the image forming units 13Y, 13M, 13C and 13K on the ROS 14 located thereunder, and toner particles and the like can stick to the ROS 14 to reduce image quality.

In a tandem type digital color printer and copying machine utilizing a dust protective member for an image exposure device according to the present embodiment, as shown in FIGS. 1 and 4, the first and second baffles 50 and 52 cover the top of the windows 21 of the ROS 14 to prevent particles such as toner from directly dropping on and sticking to the windows 21 of the ROS 14. In addition, since the shutter members 75 are provided in the regions B surrounded by the first and second baffles 50 and 52 to cover the windows 21 of the ROS 14 as shown in FIG. 4, it is possible to prevent particles such as toner from sticking to the windows 21 of the ROS 14 with higher reliability.

In the tandem type digital color printer and copying machine, as shown on the right-hand side of FIG. 4, the shutter members 75 covering the windows 21 of the ROS 14 are opened when images are to be formed. As described later, the shutter members 75 may be opened after the air flow generating unit 53 generates air flows A which pass over the openings located at the upper ends of the first and second baffles 50 and 52.

As shown in FIGS. 5 through 9, the air flow generating unit 53 starts the intake fan 54 and exhaust fan 65 to generate air flows A which flow from the intake fan 54 through the intake duct 56, ducts 57Y, 57M, 57C and 57K, intake paths 59 and ducts 63 for forming air flows to pass over the openings 58 located at the upper ends of the first and second baffles 50 and 52. The filter 55 is provided on the entrance side of the intake fan 54, and the filter 55 eliminates particles such as toner.

The air flows A generated to pass over the openings 58 located at the upper ends of the first and second baffles 50 and 52 are exhausted by the exhaust fan 65. The exhaust fan 65 generates air flows A which flow through the exhaust duct 67, ducts 68Y, 68M, 68C and 68K, exhaust paths 69 and ducts 73 for forming air flows to pass over the openings 58 located at the upper ends of the first and second baffles 50 and 52. As shown in FIG. 8, the filter 66 is provided on the exit side of the exhaust fan 65, and the filter 66 eliminates particles such as toner.

As described above, according to the present embodiment has a configuration including the first and second baffles 50 and 52 for preventing particles from sticking to the windows 21 of the ROS 14 by covering the top of the windows 21 of the ROS 14 without blocking the optical path 51 of the ROS 14 and the air flow generating unit 53 for generating air flows A for preventing particles from entering the regions B covered by the first and second baffles 50 and 52. Therefore, the first and second baffles 50 and 52 make it possible to prevent particles from sticking to the windows 21 of the ROS 14, and the air flow generating unit 53 generates air flows A to prevent particles from entering the regions B covered by the first and second baffles 50 and 52 to make it possible to prevent particles from entering the regions B covered by the first and second baffles 50 and 52. Further, no condensation of atmospheric moisture occurs because the air flows A are not in direct contact with the windows 21 of the ROS 14.

Since the air flows A only prevent particles from entering the regions covered by the dust protective members and do not directly contact the windows 21 of the ROS 14, dust on the windows 21 of the ROS 21 can be scattered only by taking air with the intake fan 54 to prevent dirt and damage on the windows 21 of the ROS 14.

Further, according to the present embodiment, the shutter members 75 are provided which are provided below the paths for the air flows A and which can be moved to positions where they directly cover the windows 21 of the ROS 14. Even when the air flows A are stopped, it is therefore possible to reliably prevent particles entering the regions B covered by the first and second baffles 50 and 52 from sticking to the windows 21 of the ROS 14 by closing the shutter members 75.

According to the present embodiment, the air flow generating unit 53 is set such that substantially zero static pressure is generated above the openings 58 at the upper ends of the first and second baffles 50 and 52 and such that a positive pressure and a negative pressure are generated upstream and downstream of the openings 58 respectively. Therefore, even in a configuration in which the air flows A for preventing particles from entering the regions B covered by the first and second baffles 50 and 52 are generated by the air flow generating unit 53, it is possible to reliably prevent, for example, zero negative pressure from being generated above the openings 58 located at the upper ends of the first and second baffles 50 and 52 to attract particles in the neighborhood.

Further, the air flow generating unit 53 of the present embodiment has a configuration including both of the intake fan 54 for taking air from one end of the photosensitive drums 15 in the longitudinal direction thereof and the exhaust fan 65 for exhausting air therefrom and the rectifier plates 64 and 74 for deflecting the direction of the air flows A taken in and exhausted by the intake fan 54 and exhaust fan 65 in a substantially orthogonal direction to generate substantially uniform air flows A in the longitudinal direction of the photosensitive drums 15. As a result, even when the air flow generating unit 53 is configured to take in or exhaust air at one longitudinal end of the photosensitive drums 15, substantially uniform air flows A can be generated by the rectifier plates 64 and 74 in the longitudinal direction of the photosensitive drums 15, which makes it possible to prevent the dust protective effect from becoming insufficient when, for example, the air flows are weak even in part and to thereby ensure the dust protective effect achieved by the air flows A.

According to the present embodiment, the spaces separated by the rectifier plates 64 and 74 at the ends where the intake fan 54 and exhaust fan 65 are located are open with gradually changing opening areas. While intake and exhaust of air is normally weak on the sides of the intake fan 54 and exhaust fan 65, since the opening areas of the spaces separated by the rectifier plates 64 and 74 at the end where the intake fan 54 and exhaust fan 65 are located gradually change, air can be sufficiently taken in and exhausted on the sides of the intake fan 54 and exhaust fan 65, which consequently makes it possible to reliably generate substantially uniform air flows in the longitudinal direction of the photosensitive drums 15.

Further, according to the present embodiment, the ends of the second baffles 52 are located in proximity to the surface of the photosensitive drums 15 to form microscopic gaps G between the second baffles 52 and the surface of the photosensitive drums 15, thereby generating air flows A which pass through the microscopic gaps G. Since the air flows A passing through the microscopic gaps G are thus at a flow rate as high as about 0.42 m/s, even when an intake fan 54 having a small capacity is used, the fast air flows A make it possible to reliably prevent particles from entering the regions B covered by the first and second baffles 50 and 52.

In the present embodiment, the air flow generating unit 53 puts the ducts 56 and 67 on the sides of the intake fan 54 and exhaust fan 65 in communication with each other, and the ducts 59 and 69 in the vicinity of the photosensitive drums 15 are formed by plural members. Therefore, some of the ducts of the air flow generating unit 53 generates air flow A are not necessarily real ducts, but they may be substituted with plural members such as the charging members 16 and developers 17 in the vicinity of the photosensitive drums 15. This makes it possible to prevent the configuration of the ducts of the air flow generating unit 53 from becoming complicated and to prevent any increase in the number of parts.

The present embodiment has a configuration including the shutter members which are located below the paths of the air flows A and which can be moved to positions where they directly cover the windows 21 of the ROS 14; the shutter members 75 are moved to the positions where they directly cover the windows 21 of the ROS 14 when the image forming apparatus is not operating; and the shutter members are retracted from the positions where they directly cover the windows 21 of the ROS 14 and air flows A are generated by the air flow generating unit 53 when the image forming apparatus is in operation. It is therefore possible to reliably prevent particles from sticking to the windows 21 of the ROS 14 with the shutter members 75 when the image forming apparatus is not operating and to reliably prevent particles from sticking to the windows 21 of the ROS 14 with the air flow generating unit 53 when the image forming apparatus is in operation.

The present embodiment also has a configuration in which the air flow generating unit 53 generates air flows A for a certain period of time after the shutter members 75 are moved to the positions where they directly cover the windows 21 of the ROS 14. It is therefore obviously possible to reliably prevent particles from sticking to the windows 21 of the ROS 14 with the shutter members 75 when the image forming apparatus is not operating and, in addition, it is possible to reliably prevent particles from sticking to the shutter members 75 by generating air flows A for a certain period of time after the shutter members 75 are moved.

According to the present embodiment, the air flow generating unit 53 provided at the plural image forming units 13Y, 13M, 13C and 13K has a configuration in which the exhaust fan 65. and the intake fan 54 are shared by the plural image forming units; the common exhaust fan 65 and intake fan 54 are provided at image processing units located on both ends thereof; and the intake paths 59 for generating air flows A taken into the image forming units by the common intake fan 54 and the exhaust paths 69 for exhausting air flows A exhausted from the image forming units by the common exhaust fan 65 are provided between the plural image forming units 13Y, 13M, 13C and 13K a s shown in FIG. 6. This makes it possible to make better use of spaces between the plural image forming units and to make the image forming apparatus as a whole compact.

A second embodiment of the invention will now be described.

Figure 10:
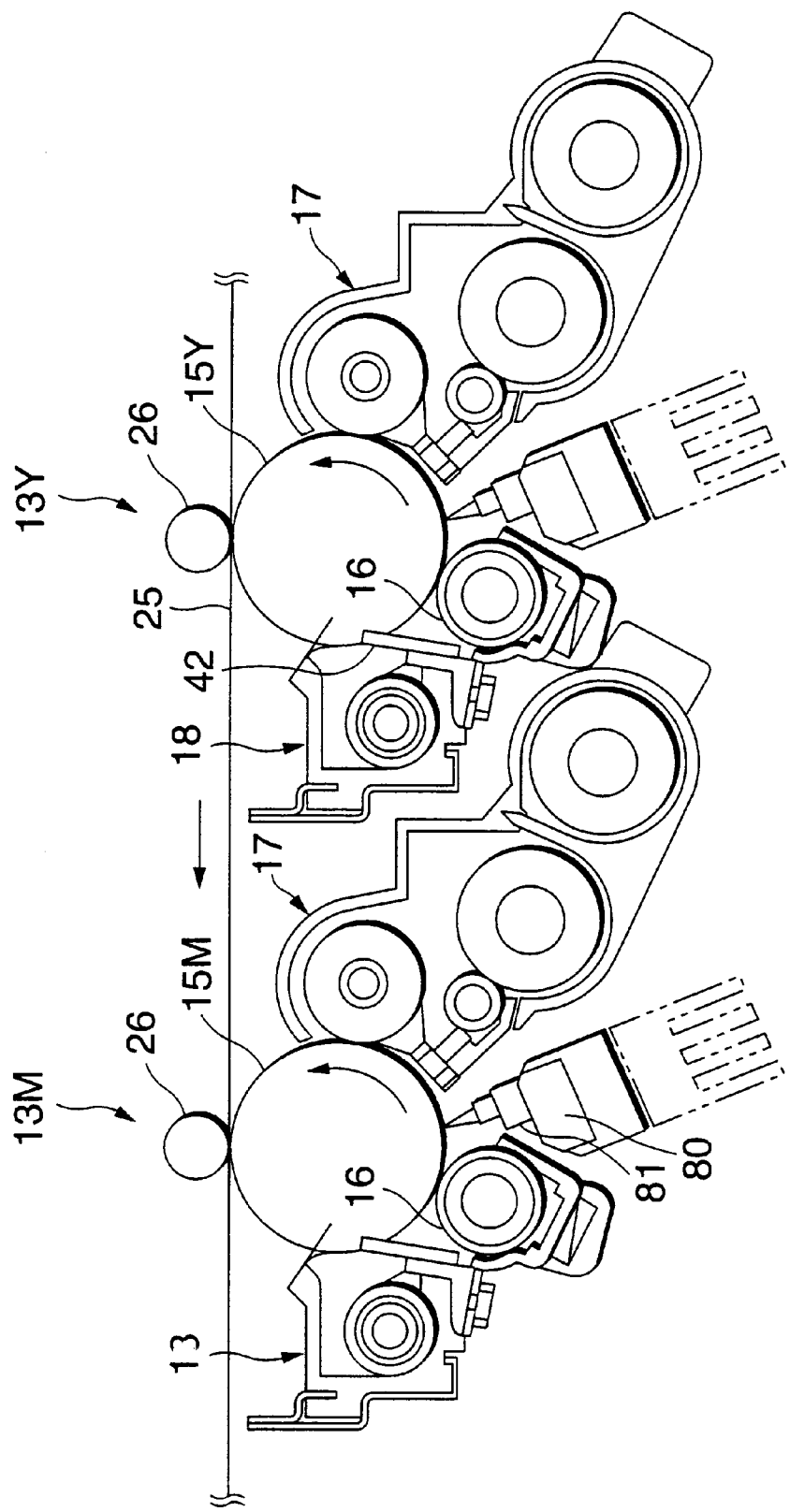
FIG. 10 illustrates a configuration of major parts of an image forming apparatus utilizing a dust protector for an image exposure device according to a second embodiment of the invention.

FIG. 10 shows a second embodiment of the invention which will be described using like reference numbers for parts like those in the first embodiment and in which LED arrays are used instead of an ROS as an image exposure device.

Figure 13:
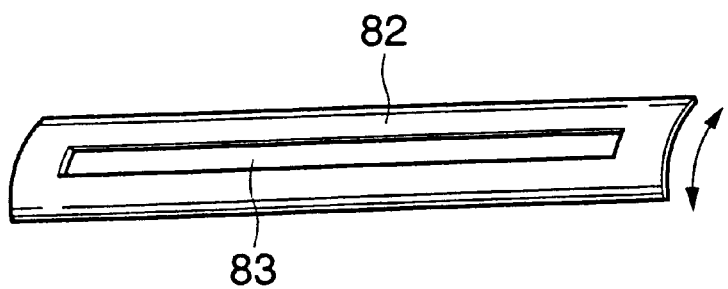
FIG. 13 is a perspective view of a shutter member.
Figure 14:
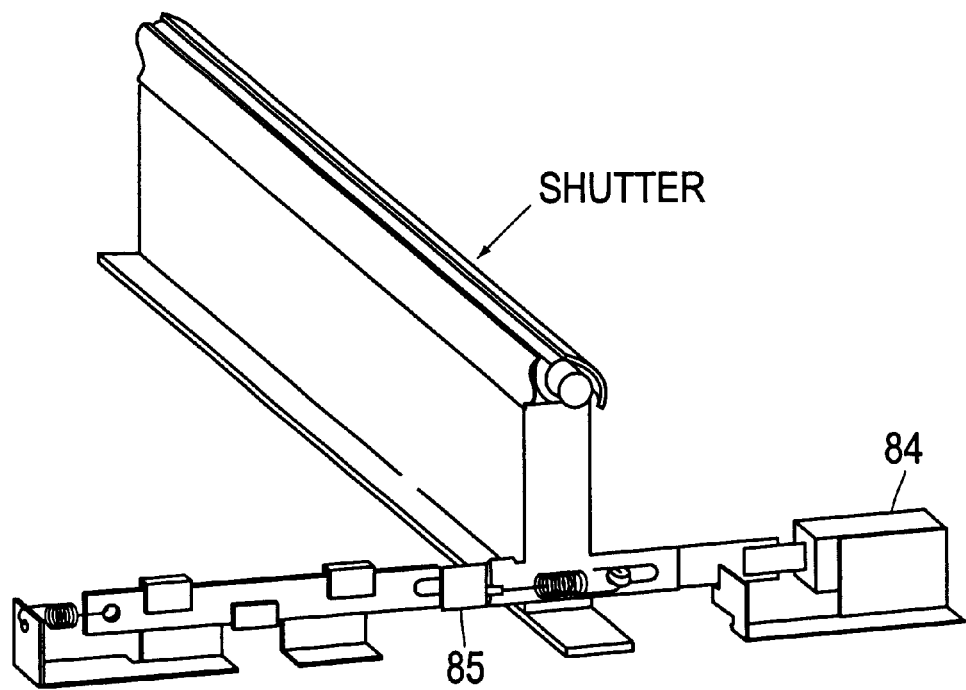
FIG. 14 is a perspective view of a driving mechanism of the shutter member.

In the present embodiment, as shown in FIG. 10, LED arrays 80 as an image exposure device are disposed under photosensitive drums 15, and the LED array 80 expose images on the surfaces of the photosensitive drums 15 through SELFOC lenses 81 (registered trademark) provided integrally with the LED arrays 80. Openable and closable shutter members 82 are provided 56 5 between the SELFOC lenses 81 (registered trademark) provided on the ends of the LED arrays 80 and the photosensitive drums 15 to cover the emitting ends of the SELFOC lenses 81 (registered trademark), thereby preventing particles such as toner from sticking to the emitting end face of the SELFOC lenses 81 (registered trademark). As shown in FIG. 13, the shutter members 82 are formed with openings 83 in the form of slits extending in the longitudinal direction thereof. As shown in FIG. 14, the shutter members 82 are opened and closed by operating rods 85 driven by solenoids 84.

Figure 11:
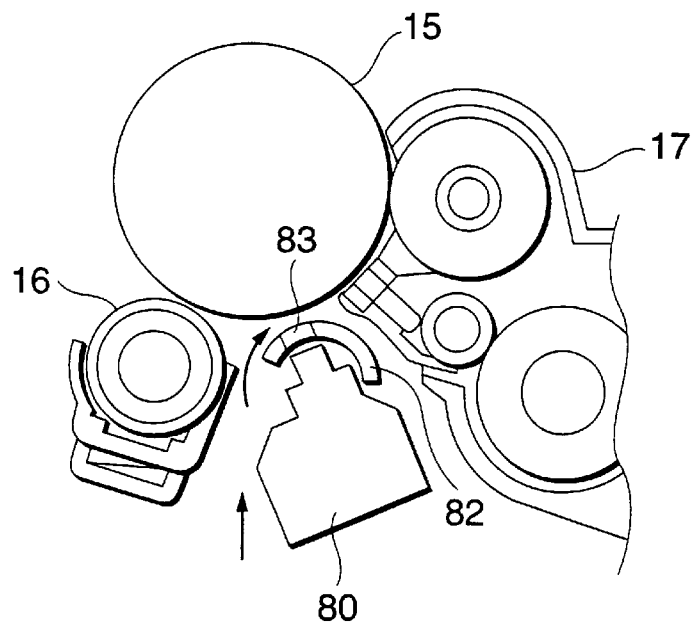
FIG. 11 illustrates a configuration of major parts of the image forming apparatus utilizing the dust protector for an image exposure device according to the second embodiment of the invention.
Figure 12:
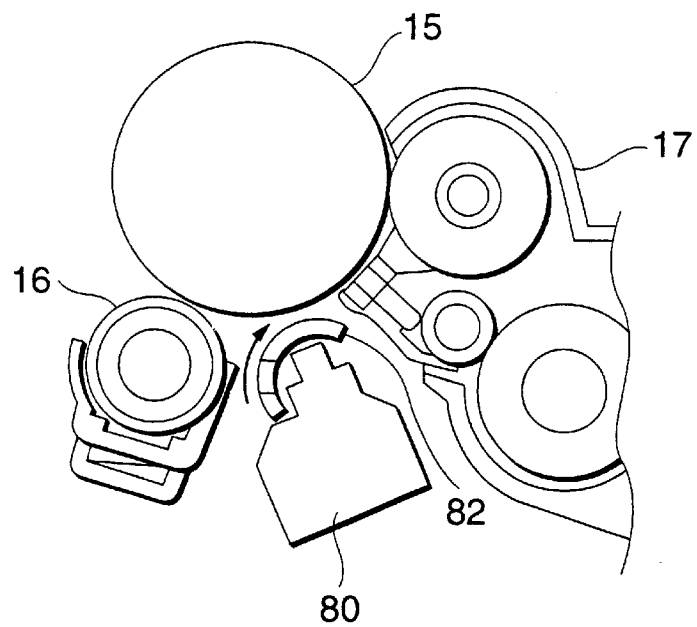
FIG. 12 illustrates a configuration of major parts of the image forming apparatus utilizing the dust protector for an image exposure device according to the second embodiment of the invention.

As shown in FIGS. 11 and 12, a support member 16a of a charging roll 16 and a developer 17 are respectively provided upstream and downstream of each LED array 80. An air flow A is generated by an air flow generating unit 53 between the shutter member 82 and the surface of the photosensitive drum 15 through ducts formed in the support member 16a of the charging roll 16 and the developer 17.

The configuration and operation of the present embodiment are otherwise similar to those of the first embodiment and will not be therefore described.

A third embodiment of the invention will now be described.

Figure 15:
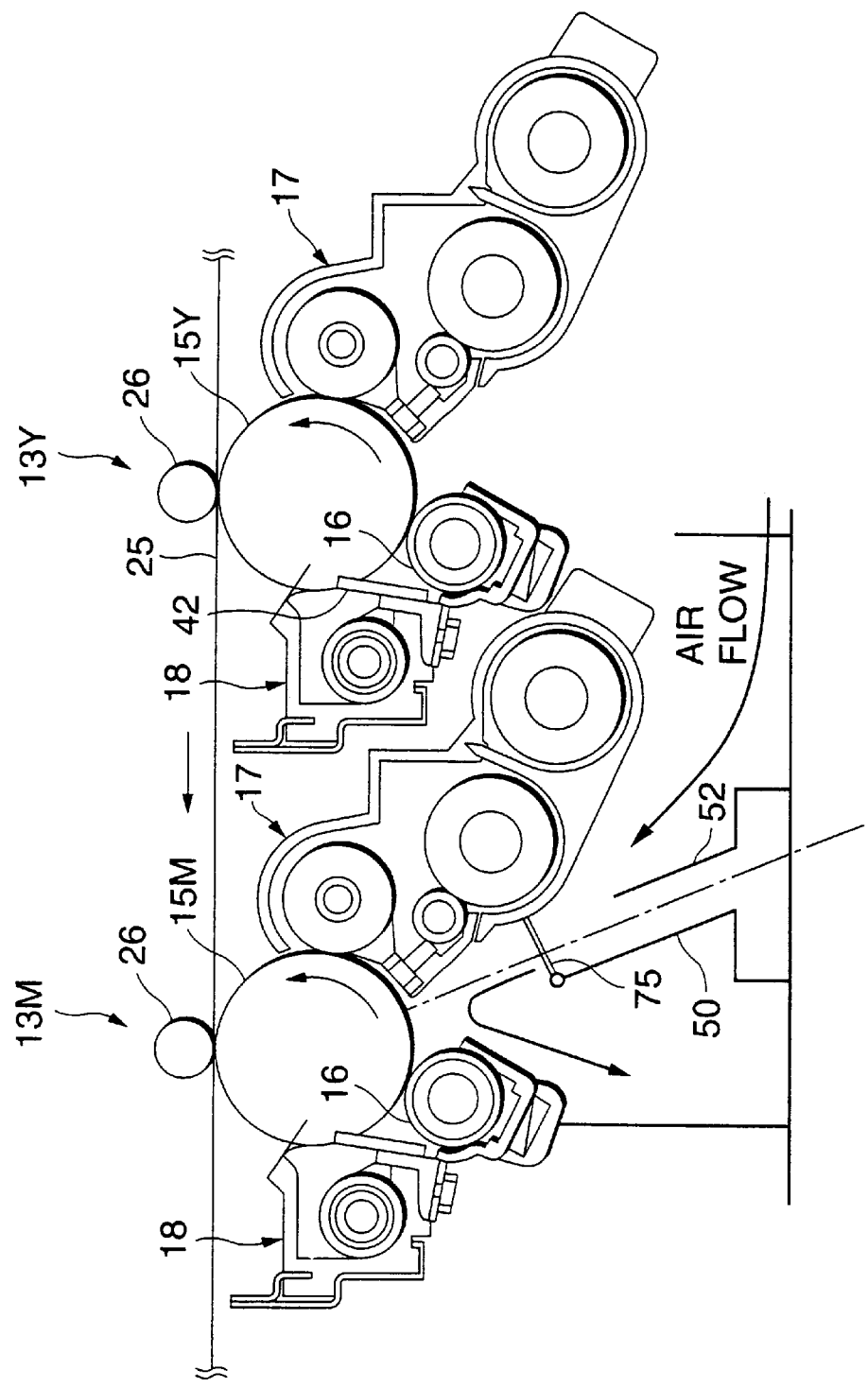
FIG. 15 illustrates a configuration of major parts of an image forming apparatus utilizing a dust protector for an image exposure device according to a third embodiment of the invention.
Figure 16A:
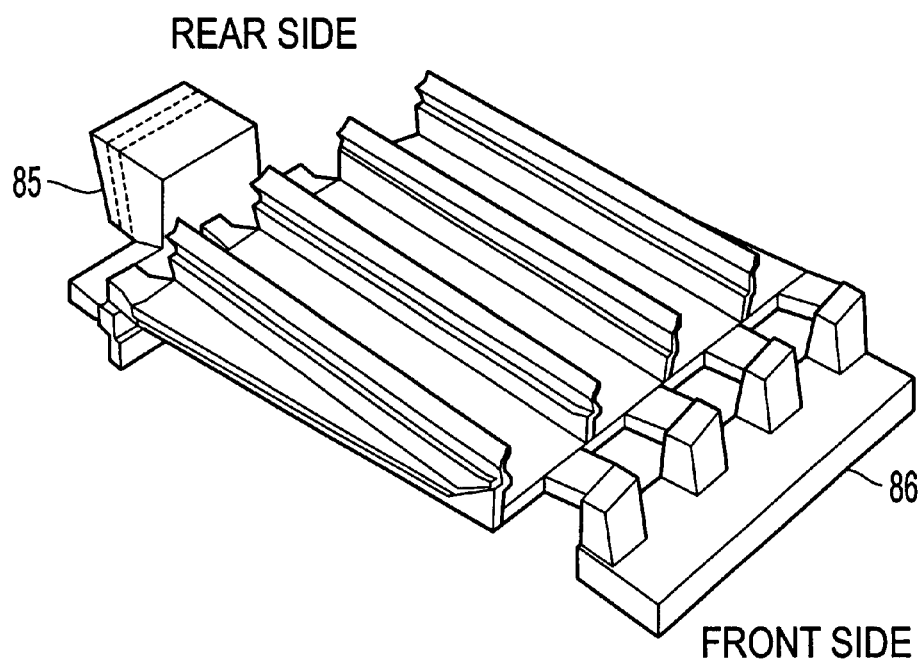
FIG. 16A is a schematic perspective view of an intake unit.
Figure 16B:
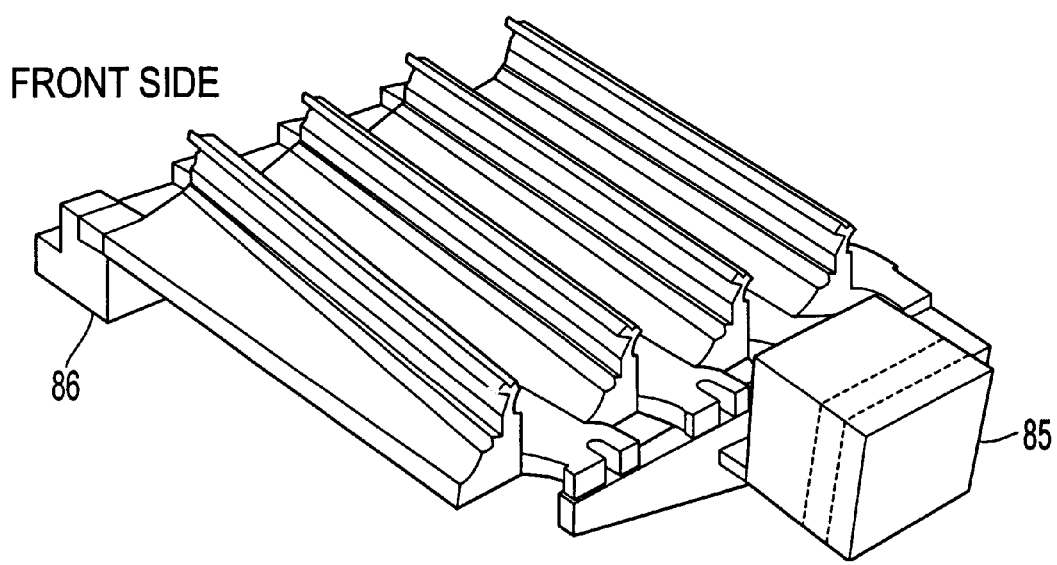
FIG. 16B is a schematic perspective view of an exhaust unit.

FIGS. 15 and 16 show a third embodiment of the invention which will be described using like reference numbers for parts like those in the first embodiment and which is different from the first embodiment in the configurations and positions of dust protective members and shutter members.

According to the present embodiment, an air flow generating unit provided at each of image forming units has exhaust unit shared by plural image forming unit; the common exhaust unit is provided in the middle of the rear side of the plural image forming units; and an intake port is provided in front of the plural image forming units.

Specifically, as shown in FIG. 15, the present embodiment has a configuration in which first and second baffles 50 and 52 having a small length are provided under developers 17 and in which shutter members 75 are provided at the top of the first baffles 50.

The present embodiment has a configuration to generate air flows A from the developers 17 toward charging rolls 16. When no dust protective member can not be inserted in spaces between drum assemblies including the charging rolls 16 and the developers 17 unlike the first embodiment, the first baffle 50 on the left is disposed substantially in parallel with the second baffle 52, and the shutter member 75 is provided at the top of the first baffle 50 which is shorter to define a small gap G (on the order of 2 to 5 mm) between the shutter member 75 and the bottom surface of the developer 17. This increases the speed of the air flow A to blow away toner that drops from the developer 17 with the air flow A from right to left in FIG. 15, thereby reliably preventing toner and the like from sticking to a window 21.

As shown in FIG. 16, the present embodiment has a configuration in which the air flow generating unit 53 provided in each of the image forming units has an exhaust fan 85 as an exhaust unit shared by the plural image forming units; the common exhaust fan 85 is provided in the middle of the rear side of the plural image forming units 13; and an intake port 86 is provided in front of the plural image forming units 13.

The configuration and operation of the present embodiment are otherwise similar to those of the first embodiment and will not be therefore described.

Some examples of experiments will now be described.

The inventors made experiments as shown in FIGS. 17A and 17B to simulate the degrees of effects of ten factors on the uniformity of air flows at the front and rear sides of each image forming unit and on the prevention of entry of air flows into baffles while varying the ten factors which are specifically the positions of the ends of the rectifier plates, the angle of the right baffle, the rounding of the right baffle, the rounding of the rectifier plates, the number of the rectifier plates, the angle of the left baffle, the presence or absence of a partition plate in the baffles, the height of the rectifier plates, the height of the base frame and the patterns of the openings at the entrances of the rectifier plates.

Figure 18:
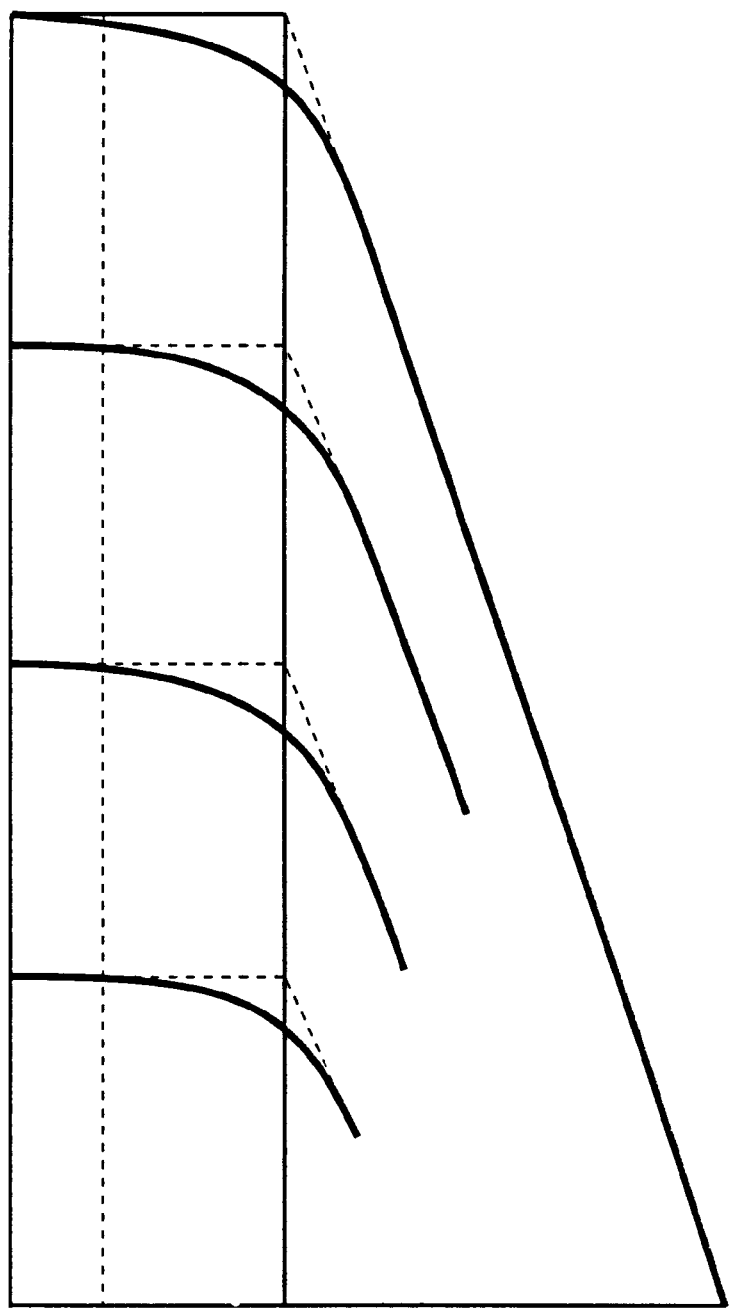
FIG. 18 is a schematic view of another configuration of rectifier plates.

Referring first to the position of the end of the rectifier plate, as shown in FIG. 18, an experimental simulation was conducted by providing the bases of rectifier plates 64 and 74 or the end of the rectifier plate 74 at the entrance of each image forming unit and in a position apart from the entrance of each image forming unit.

Figure 19:
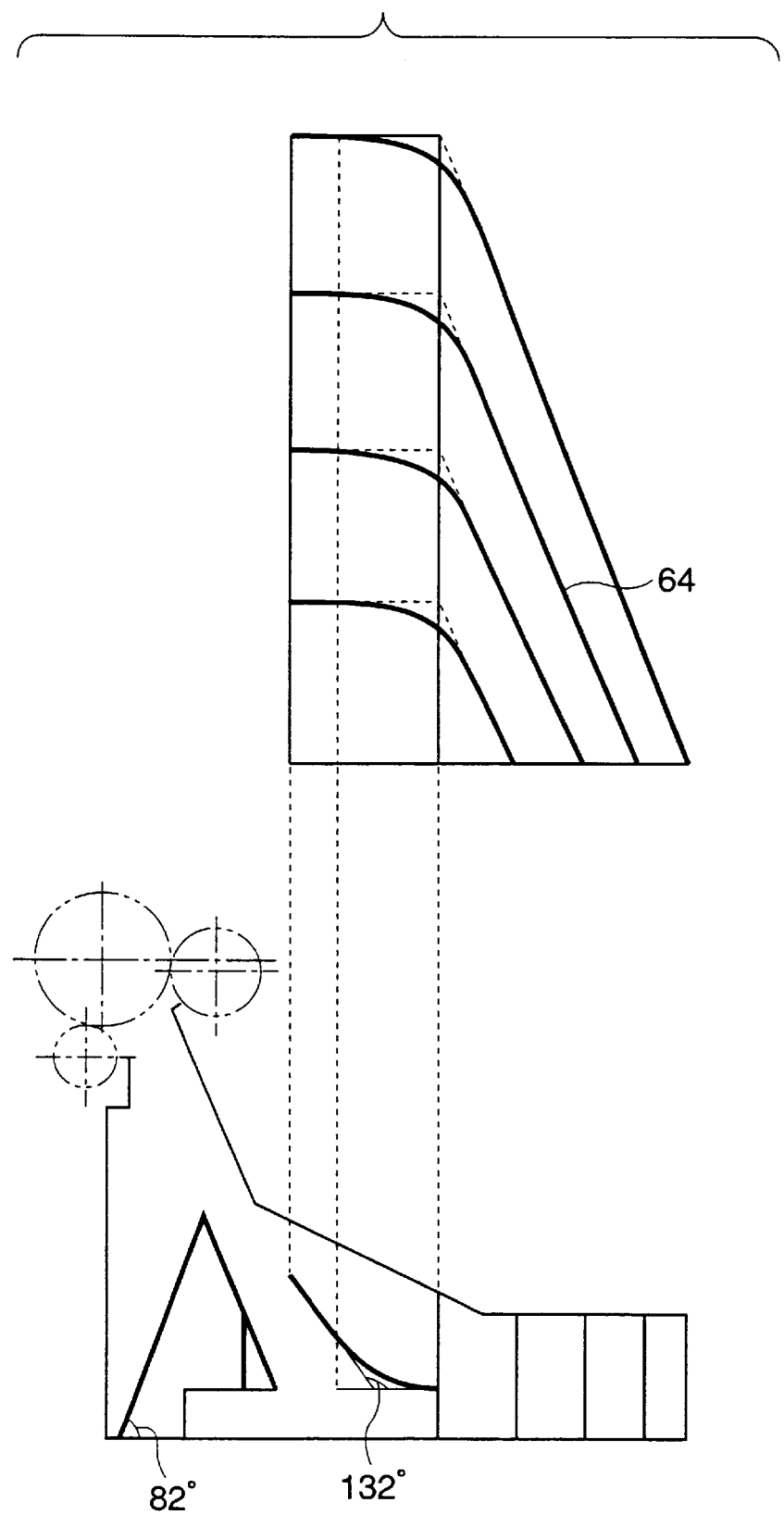
FIG. 19 is a schematic view of still another configuration of rectifier plates.
Figure 20:
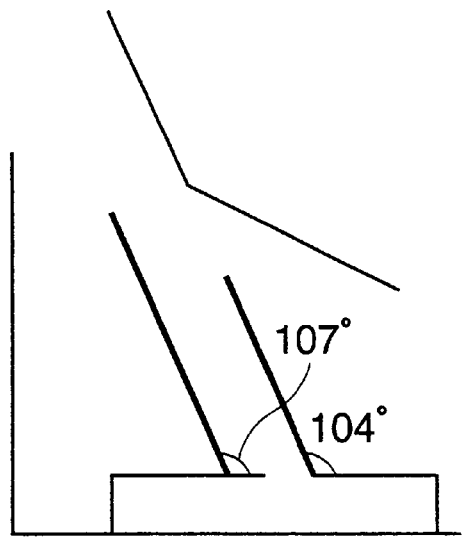
FIG. 20 is a schematic view of another configuration of baffles.

Referring to the angle and rounding of the right baffle, an experiment was conducted to simulate the degrees of effects of them on the uniformity of air flows at the front and rear sides of each image forming unit and on the prevention of entry of air flows into the baffles in a case wherein air is taken in from the side of the developer 17 as shown in FIGS. 19 and 20 unlike the first embodiment using right baffles at 132° and 104° and right baffles with and without rounding at the bases thereof.

Figure 21:
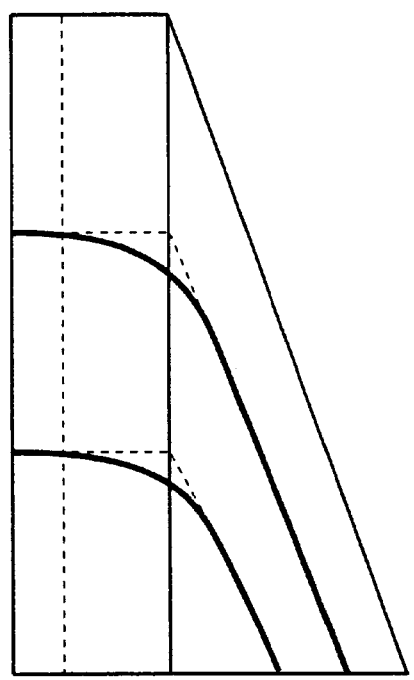
FIG. 21 is a schematic view of another configuration of rectifier plates.

Referring to the rounding and the number of the rectifier plates, an experiment was conducted to simulate the degrees of effects of them on the uniformity of air flows on the prevention of entry of air flows into the baffles by using rectifier plates 64 and 74 rounded at bent portions thereof and by using three or two rectifier plates as shown in FIGS. 19 and 21.

Referring to the angle of the left baffle and the presence or absence of a partition plate in the baffles, an experiment was conducted to simulate the degrees of effects of them on the uniformity of air flows on the prevention of entry of air flows into the baffles in a case wherein air is taken in from the side of the developer 17 as shown in FIGS. 19 and 20 unlike the first embodiment by using left baffles at angles of 82° and 107° and baffles with and without a partition plate provided therein.

Figure 22:
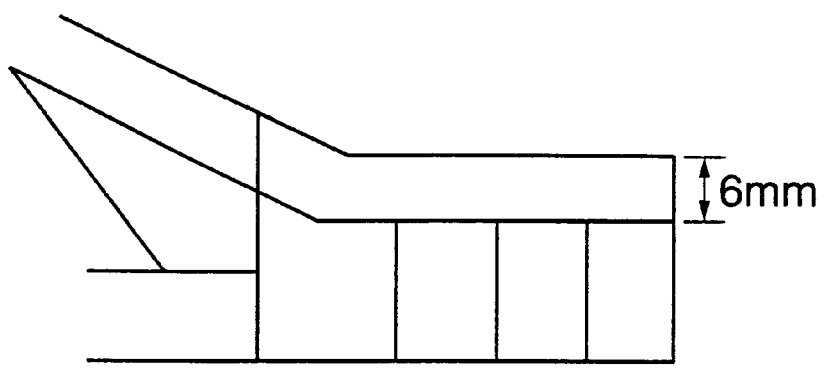
FIG. 22 is a schematic view of still another configuration of rectifier plates.

Referring to the height of the rectifier plates, the height of the base frame and the patterns of the openings at the entrances of the rectifier plates, an experiment was conducted to simulate the degrees of effects of them on the uniformity of air flows on the prevention of entry of air flows into the baffles by using a rectifier plate whose upper end reaches the ceiling and a rectifier plate that leaves a gap of 6 mm between the ceiling and the its top and by using base frames with a large and small heights as shown in FIG. 22. The effect of the patterns of the openings at the entrances of the rectifier plates was examined by using gradually changing opening areas and a constant opening area.

FIGS. 23A, 23B, 24A and 24B show results of the experiments on the effects of those factors on the uniformity of air flows and the prevention of invasion of air flows into the baffles.

Figure 23B:
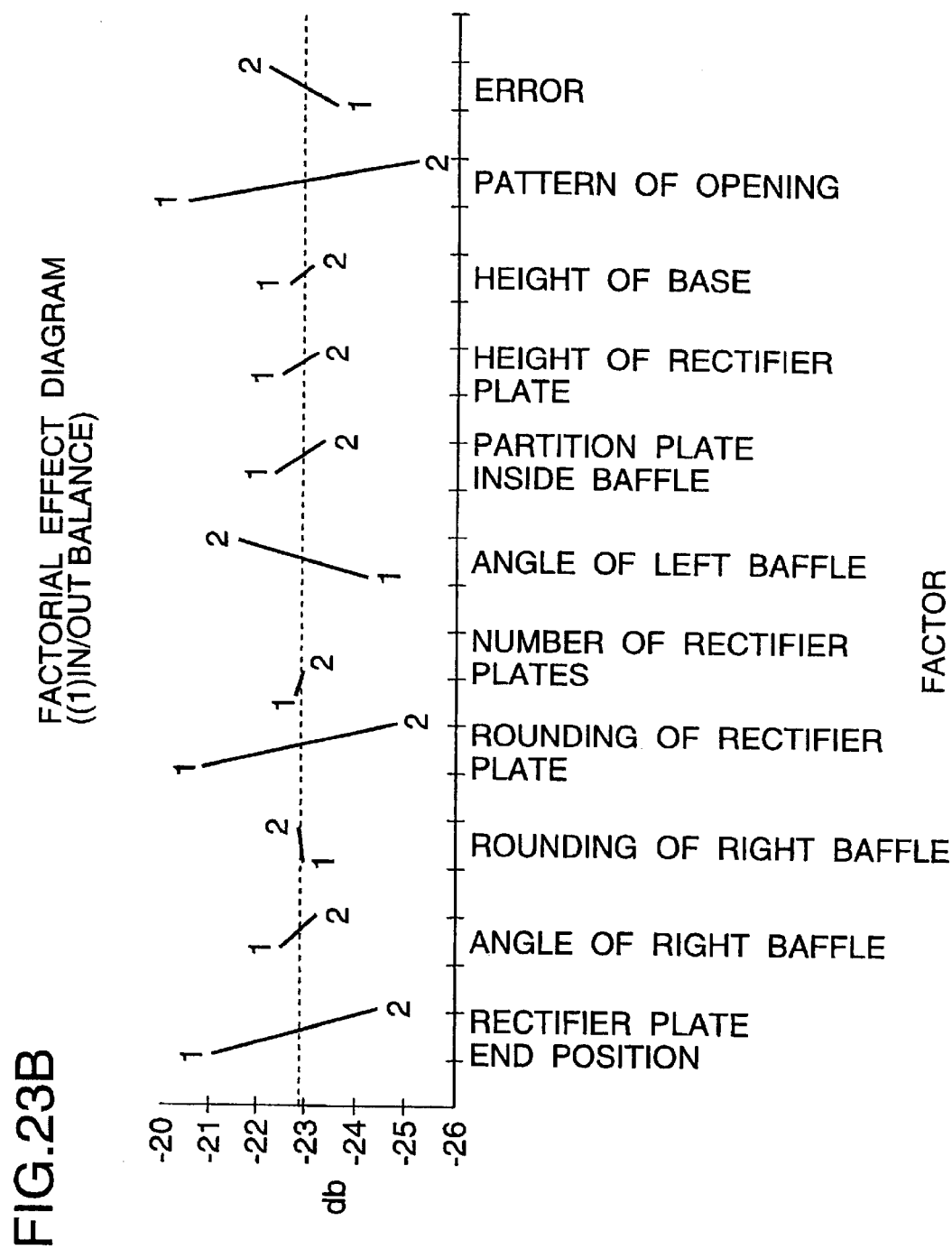
FIG. 23B is a graph showing results of the experiment.

As apparent from FIGS. 23A and 23B, the uniformity of air flows at the front and rear sides of each image forming unit is significantly affected by the positions of the ends of the rectifier plates, the rounding of the rectifier plates, the angle of the left baffles and the patterns of the openings at the entrances of the rectifier plates. By setting those factors properly, air flows at the front and rear sides of each image forming unit can be made uniform.

Figure 24B:
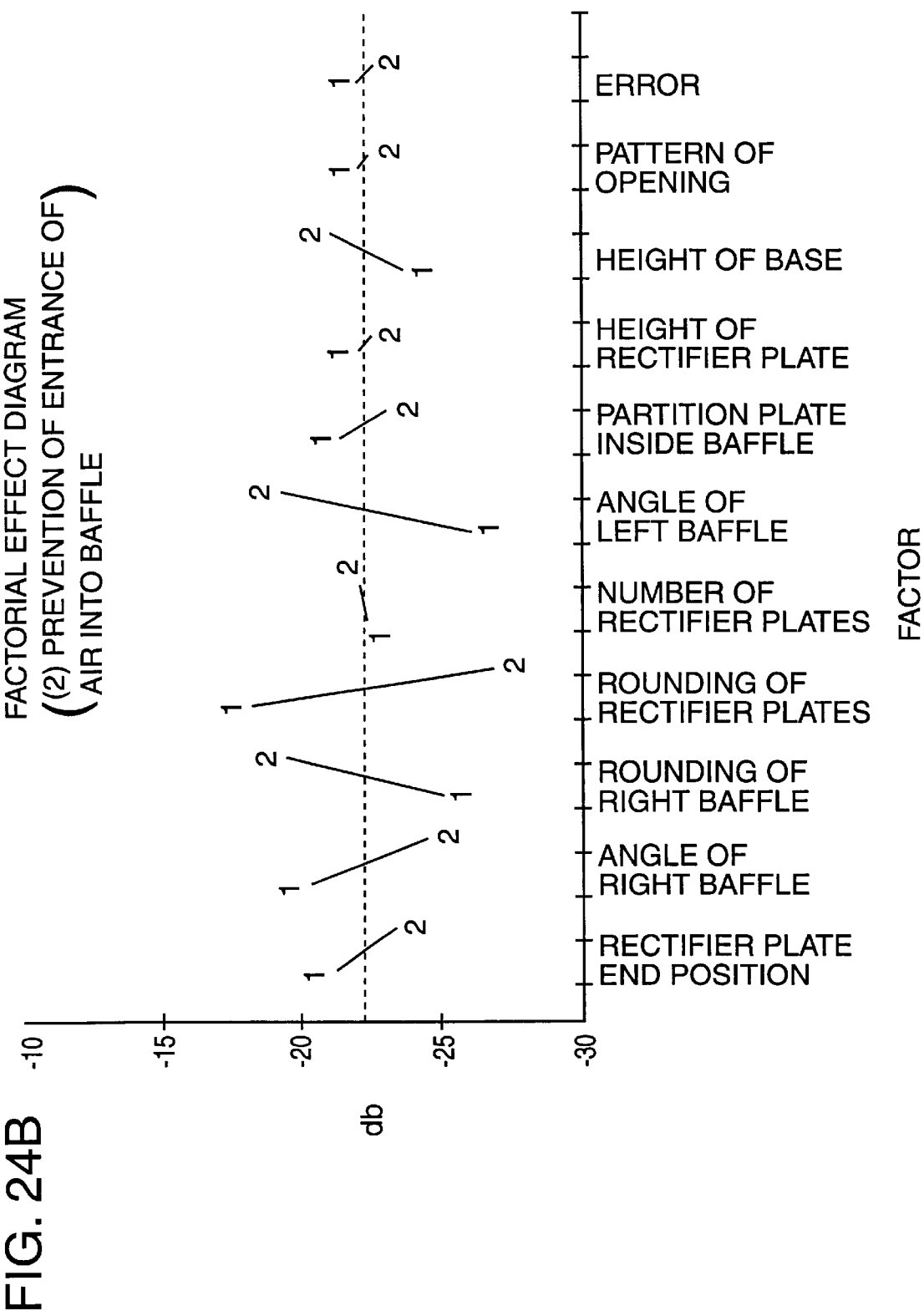
FIG. 24B is a graph showing results of the experiment.

As apparent from FIGS. 24A and 24B, the prevention of invasion of air flows into the baffles is significantly affected by the angle of the right baffles, the rounding of the right baffles, the rounding of the rectifier plates, the angle of the left baffles and the base frame height. By setting those factors properly, air flows at the front and rear sides of each image forming unit can be made uniform.

A fourth embodiment of the invention will now be described.

FIGS. 25 through 30 show a fourth embodiment of the invention which will be described using like reference numbers for parts like those in the first embodiment. The present embodiment has a configuration in which LED arrays or the like may be used as an image exposure device; the air flow generating unit provided at each of image forming units has an intake unit and an exhaust unit shared by the plural image forming units; and the common intake unit and exhaust unit takes and exhausts air into and from the image forming units through their own ducts.

Figure 25:
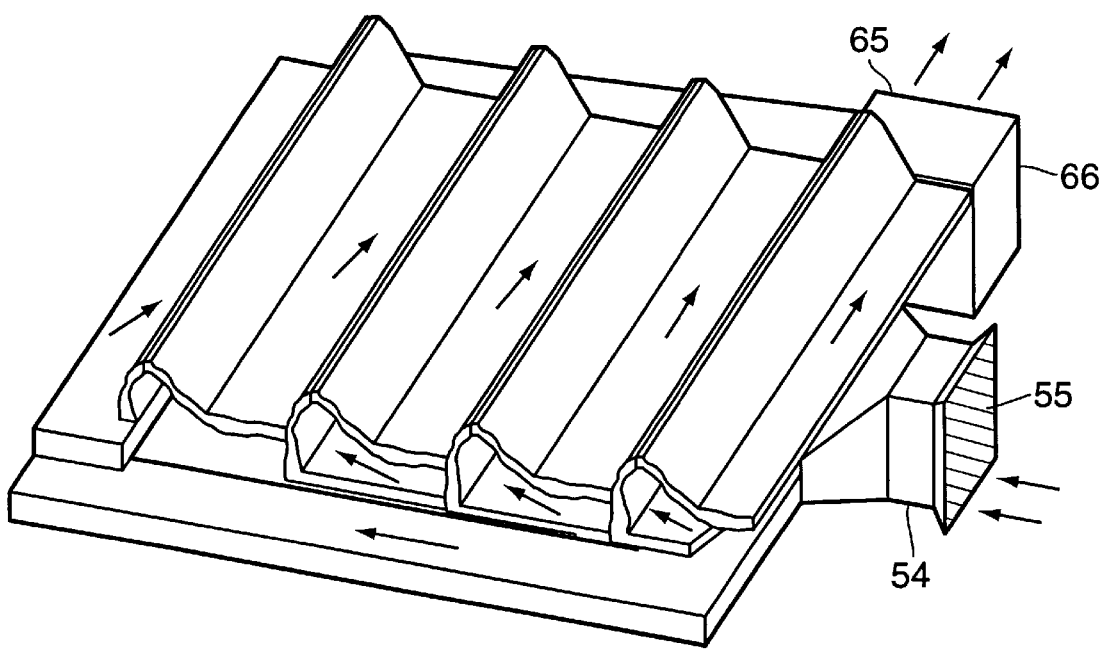
FIG. 25 is a perspective view of major parts of an image forming apparatus utilizing a dust protector for an image exposure device according to a fourth embodiment of the invention.
Figure 26:
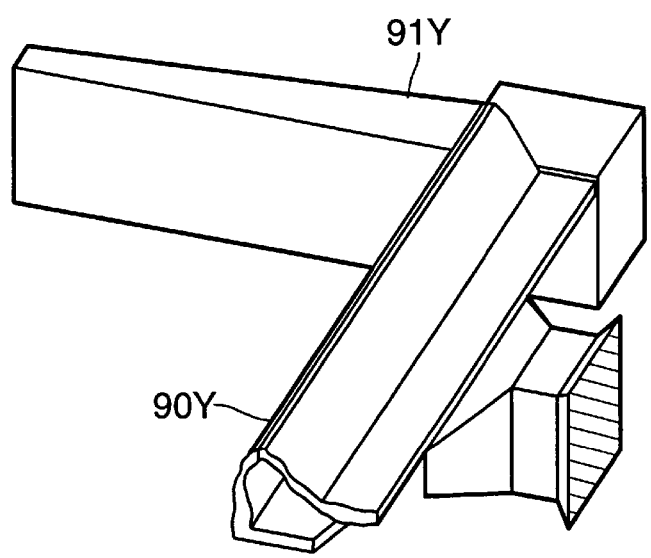
FIG. 26 is a perspective view of ducts of an image forming unit.
Figure 27:
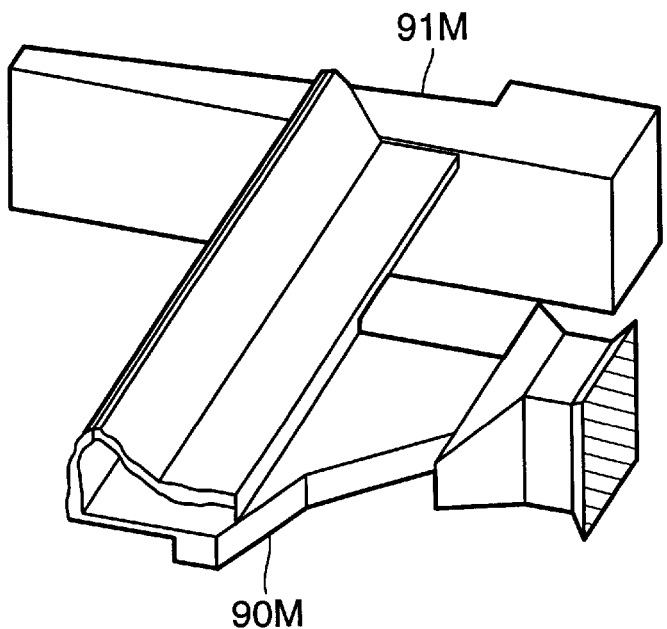
FIG. 27 is a perspective view of ducts of an image forming unit.
Figure 28:
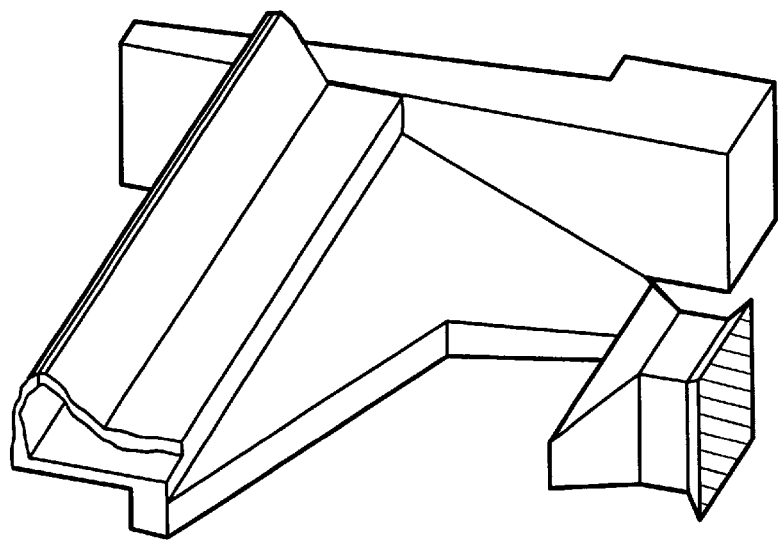
FIG. 28 is a perspective view of ducts of an image forming unit.
Figure 29:
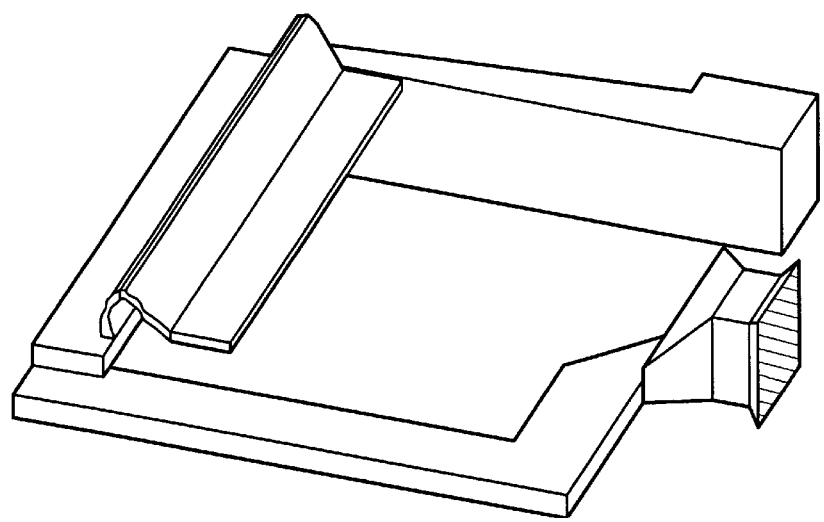
FIG. 29 is a perspective view of ducts of an image forming unit.

Specifically, according to the present embodiment, as shown in FIG. 25, an intake fan 54 as an intake unit and an exhaust fan 65 as an exhaust unit are provided at one end of plural image forming units. As shown in FIGS. 25 through 29, air is taken from the intake fan 54 into each of the image forming units through an intake duct 90Y uniquely formed for the same. As shown in FIGS. 25 through 29, the exhaust fan 65 exhausts air from each of the image forming units through an exhaust duct 91Y uniquely formed for the same.

Figure 30:
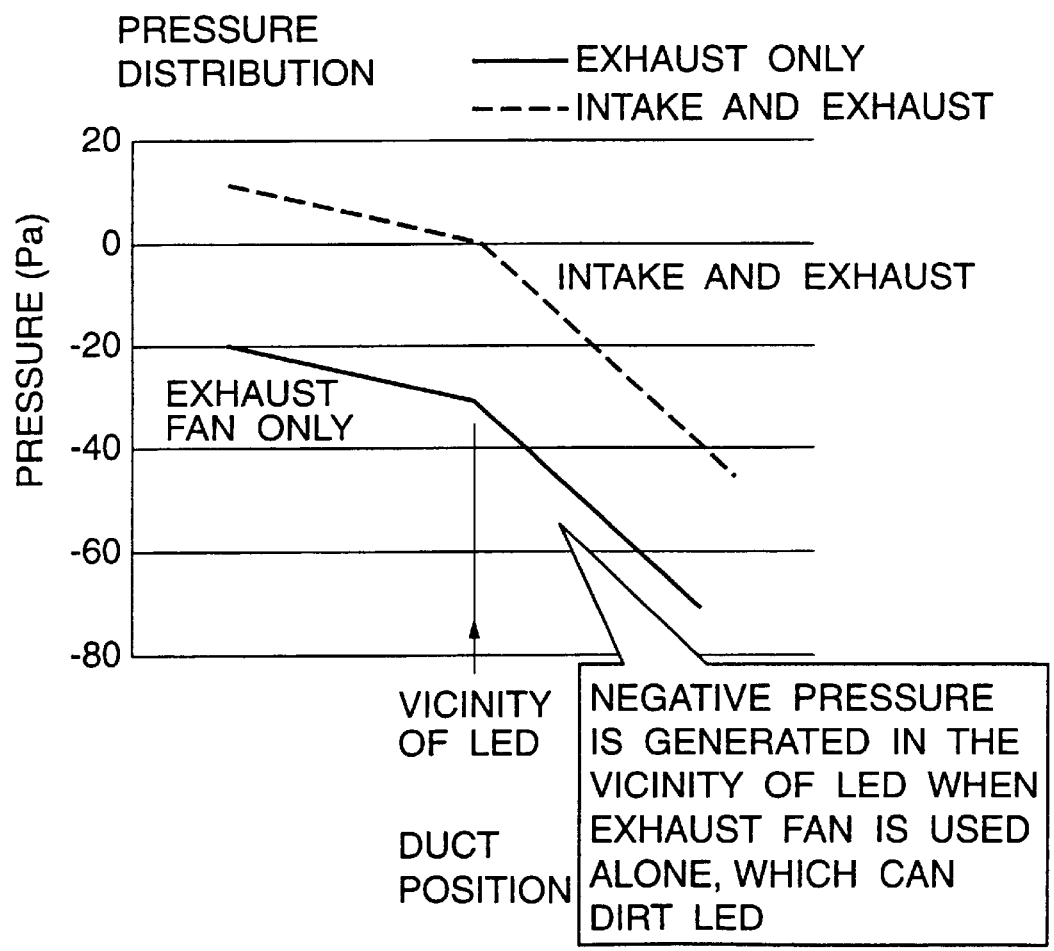
FIG. 30 is a graph showing pressure distribution in the position of a duct.

According to the present embodiment, as shown in FIG. 30, an air flow generating unit 53 is set such that it generates substantially zero static pressure above openings 58 at upper ends of first and second baffles 50 and 52 and such that it generates a positive pressure and a negative pressure upstream and downstream of the openings 58 respectively. As a result, even in a configuration in which air flows A for preventing particles from entering regions B covered by the first and second baffles 50 and 52 are generated by the air flow generating unit 53, it is possible to reliably prevent the generation of zero negative pressure at the openings at the upper ends of the first and second baffles 50 and 52 which can attract particles in the neighborhood.

The configuration and effects of the present embodiment are otherwise the same as those of the first embodiment and will not therefore be described.

As described above, the present invention makes it possible to provide a duct protector for an image exposure device which is not only capable of preventing particles from sticking to windows of the image exposure device but also free from moisture condensation as a result of direct contact between the windows of the image exposure device and the atmosphere and to provide an image forming apparatus utilizing the same.

The present invention also makes it possible to provide a dust protector for an image exposure device which is free from dirt on a shutter member provided in the vicinity of the image exposure device or the like as needed and to provide an image forming apparatus utilizing the same.

The present invention also makes it possible to provide a dust protector for an image exposure device in which a blower blows windows or the like of the image exposure device to scatter dust around the windows or the like to eliminate the possibility of dirt and damage on the windows or the like and to provide an image forming apparatus utilizing the same.

The present invention further makes it possible to provide a dust protector for an image exposure device which is capable of preventing particles from entering the device through an opening of the dust protector to reliably prevent dirt and damage on members such as windows even when the dust protector is provided above the windows of the image exposure device and to provide an image forming apparatus utilizing the same.

What is claimed is:

1. A dust protector for an image exposure device for performing image exposure on a member to be exposed from below the same, comprising:
   a dust protective member that covers the image exposure device from above without blocking an optical path of the image exposure device; and
   an air flow generating unit, having an intake unit and an exhaust unit, that generates an air flow for preventing particles from entering a region covered by the dust protective member.

2. A dust protector for an image exposure device according to claim 1, wherein the air flow generating unit generates an air flow which passes over an opening located at an upper end of the dust protective member.

3. A dust protector for an image exposure device according to claim 2, further comprising:
   a shutter member which is provided below the path of the air flow and which can be moved to a position where it directly covers at least a member located above the optical path of the image exposure device.

4. A dust protector for an image exposure device according to claim 2, wherein the air flow generating unit is set so that it generates substantially zero static pressure above the opening located at the upper end of the dust protective member and generates a positive pressure and a negative pressure upstream and downstream of the opening respectively.

5. A dust protector for an image exposure device according to claim 2, wherein the air flow generating unit has at least either an intake unit that takes air from one end of a member to be exposed in the longitudinal direction thereof or an exhaust unit that exhausts air therefrom and at least one rectifier late that deflects the direction of the air flow taken in or exhausted by the intake or exhaust unit in a substantially orthogonal direction to generate a substantially uniform air flow in the longitudinal direction of the member to be exposed.

6. A dust protector for an image exposure device according to claim 5, wherein each of the at least one rectifier plate is provided for generating a substantially uniform air flow in the longitudinal direction of the member to be exposed and wherein spaces separated by the at least one rectifier plate at an end where the intake unit or the exhaust unit is located are open with gradually changing opening areas.

7. A dust protector for an image exposure device according to claim 2, wherein a part of the dust protective member is located in proximity to a surface of an image forming member located in the vicinity thereof to define a microscopic gap between the dust protective member and the surface of the image forming member, thereby generating an air flow that passes through the microscopic gap.

8. A dust protector for an image exposure device according to claim 7, wherein the air flow generating unit puts ducts at the intake unit and the exhaust unit in communication with each other and wherein a duct is formed by a plurality of members in the vicinity of the member to be exposed.

9. An image forming apparatus having an image exposure unit provided under an image carrying body, comprising:

a dust protective member that prevents particles from sticking to at least a member located above an optical path of the image exposure unit by covering the image exposure unit from above without blocking the optical path of the image exposure unit;

an air flow generating unit, having an intake unit and an exhaust unit, that generates an air flow for preventing particles from entering a region covered by the dust protective member; and a shutter member which is provided below the path of the air flow and which can be moved to a position where it directly covers at least the member located above the optical path of the image exposure unit, wherein the shutter member is moved to the position where it directly covers at least the member located above the optical path of the image exposure unit when the image forming apparatus is not operating and wherein the shutter member is retracted from the position and an air flow is generated by the air flow generating unit when the image forming apparatus is in operation.

10. An image forming apparatus according to claim 9, wherein the air flow generating unit generates an air flow for a certain period of time after the shutter member is moved to the position where it directly covers at least the member located above the optical path of the image exposure unit.

11. An image forming apparatus according to claim 9 wherein the air flow generating unit generates an air flow which passes over an opening located at an upper end of the dust protective member.

12. An image forming apparatus according to claim 9, wherein the air flow generating unit comprises intake unit that takes air from one end of the image carrying body in the longitudinal direction thereof and a rectifier plate for deflecting the direction of the air flow taken in by the intake unit in a substantially orthogonal direction to generate a substantially uniform air flow in the longitudinal direction of the image carrying body.

13. An image forming apparatus comprising:

a plurality of image forming units with respective image carrying bodies on which toner images in different colors can be formed provided in parallel with each other; and an image exposure unit that performs image exposure on the image carrying bodies of the plurality of image forming units provided under the image carrying bodies of the plurality of image forming units, wherein each of the image forming units comprises a dust protective member for preventing particles from sticking to at least a member located at an upper end of an optical path of the image exposure unit by covering the image exposure unit from above without blocking the optical path of the image exposure unit and an air flow generating unit that generates an air flow which passes over an opening located at an upper end of the dust protective member and wherein the air flow generating unit provided at each of the image forming units has an intake unit shared by the plurality of image forming units; the common intake unit is provided at one end in a longitudinal direction of an image carrying body of the image forming unit located at one end; and an opening area of ducts for supplying air from the common intake unit to the image forming units is greater on the side of the intake unit and smaller on the side opposite thereto.

14. An image forming apparatus comprising:

a plurality of image forming units with respective image carrying bodies on which toner images in different colors can be formed provided in parallel with each other and;

an image exposure unit that performs image exposure on the image carrying bodies of the plurality of image forming units provided under the image carrying bodies of the plurality of image forming units, wherein each of the image forming units comprises a dust protective member for preventing particles from sticking to at least a member located at an upper end of an optical path of the image exposure unit by covering the image exposure unit from above without blocking the optical path of the image exposure unit and an air flow generating unit that generates an air flow which passes over an opening located at an upper end of the dust protective member and wherein the air flow generating unit provided at each of the image forming units has an intake unit shared by the plurality of image forming units, and an intake path of the common intake unit is provided on a diagonal line between image forming units located on both ends.

15. A dust protector for an image exposure device according to claim 5, wherein the intake unit comprises a filter that removes particles provided at an intake side thereof.

16. An image forming apparatus according to claim 13, wherein the intake unit comprises a filter that removes particles provided at an intake side thereof.

17. A dust protector for an image exposure device comprising:

a dust protection member that covers the image exposure device from above without blocking an optical path of the image exposure device;

an air flow generating unit that generates an air flow for preventing particles from entering a region covered by the dust protection member;

wherein the air flow generating unit has a least either an intake unit that takes air from one end of a member to be exposed in the longitudinal direction thereof or an exhaust unit that exhausts air therefrom and at least one rectifier plate that deflects the direction of the air flow taken in or exhausted by the intake or exhaust unit in a substantially orthogonal direction to generate a substantially uniform air flow in the longitudinal direction of the member to be exposed; and wherein the air flow generating unit generates an air flow which passes over an opening located at an upper end of the dust protection member.

18. A dust protector for an image exposure device according to claim 17, wherein each of the at least one rectifier plate is provided for generating a substantially uniform air flow in the longitudinal direction of the member to be exposed and wherein the spaces separated by the at least one rectifier plate at the end where the intake unit or the exhaust unit is located are open with gradually changing opening areas.

19. An image forming apparatus having an image exposure unit provided under an image carrying body, comprising:

a dust protective member that prevents particles from sticking to at least a member located above an optical path of the image exposure unit by covering the image exposure unit from above without blocking the optical path of the image exposure unit;

an air flow generating unit having an intake unit and an exhaust unit that generates an air flow for preventing particles form entering a region covered by the dust protective member; and a shutter member which is provided below the path of the air flow and which can be moved to a position where it directly covers at least the member located above the optical path of the image exposure unit;

wherein the shutter member is moved to the position where it directly covers at least the member located above the optical path of the image exposure unit when the image forming apparatus is not operating and is retracted from the position and an air flow is generated by the air flow generating unit when the image forming apparatus is in operation; and wherein the air flow generating unit comprises the intake unit that takes air from one end of the image carrying body in the longitudinal direction thereof and a rectifier plate for deflecting the direction of the air flow taken in by the intake unit in a substantially orthogonal direction to generate a substantially uniform air flow in the longitudinal direction of the image carrying body.

* * * * *